United States Patent
Sonare et al.

(10) Patent No.: US 11,336,968 B2
(45) Date of Patent: May 17, 2022

(54) METHOD AND DEVICE FOR GENERATING CONTENT

(71) Applicant: Samsung Electronics Co., Ltd., Suwon-si (KR)

(72) Inventors: Praveen Sonare, Noida (IN); Rishabh Kumar, Noida (IN); Ashwani Kathuria, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/451,596

(22) Filed: Jun. 25, 2019

(65) Prior Publication Data
US 2020/0059703 A1 Feb. 20, 2020

(30) Foreign Application Priority Data

Aug. 17, 2018 (IN) .............................. 201811030895
Apr. 10, 2019 (KR) ........................ 10-2019-0042183

(51) Int. Cl.
| | | |
|---|---|---|
| H04N 21/81 | (2011.01) | |
| G06K 9/00 | (2022.01) | |
| H04N 21/8545 | (2011.01) | |
| G06F 16/583 | (2019.01) | |
| G06F 16/58 | (2019.01) | |

(52) U.S. Cl.
CPC ....... *H04N 21/8133* (2013.01); *G06F 16/583* (2019.01); *G06F 16/5866* (2019.01); *G06K 9/00892* (2013.01); *H04N 21/8545* (2013.01)

(58) Field of Classification Search
None
See application file for complete search history.

(56) References Cited

U.S. PATENT DOCUMENTS

| 7,043,048 B1 | 5/2006 | Ellingson | |
|---|---|---|---|
| 7,783,892 B2 * | 8/2010 | Russell | G06F 21/32 |
| | | | 713/186 |

(Continued)

FOREIGN PATENT DOCUMENTS

| KR | 10-2009-0084447 A | 8/2009 |
|---|---|---|
| KR | 10-2018-0079898 A | 7/2018 |
| WO | 2015170138 A1 | 11/2015 |

OTHER PUBLICATIONS

International Search Report dated Oct. 11, 2019, issued in a counterpart International application No. PCT/KR2019/008061.

(Continued)

*Primary Examiner* — An Son P Huynh
(74) *Attorney, Agent, or Firm* — Jefferson IP Law, LLP

(57) ABSTRACT

An operation method for generating content including a user identification (ID), and an apparatus therefor are provided. The operation method of the device includes obtaining mapping information by making one or more pieces of biometric information for each of a plurality of users correspond to a user ID of each of the plurality of users, obtaining first content including a first user by photographing the first user, obtaining first biometric information of the first user, determining a first user ID corresponding to the first biometric information of the first user, based on the mapping information, and associating the first content with the first user ID, and storing the association of the first content with the first user ID.

20 Claims, 18 Drawing Sheets

(56) References Cited

U.S. PATENT DOCUMENTS

| | | | |
|---|---|---|---|
| 8,816,855 B2 | 8/2014 | Kreiner et al. | |
| 8,839,306 B2* | 9/2014 | Roberts | H04N 21/4438 725/60 |
| 9,137,558 B2* | 9/2015 | Gibbon | H04N 21/4661 |
| 9,430,629 B1* | 8/2016 | Ziraknejad | G06F 16/51 |
| 9,531,707 B1* | 12/2016 | Daniel | H04L 63/0861 |
| 9,876,788 B1 | 1/2018 | Ziraknejad et al. | |
| 9,940,746 B2* | 4/2018 | Pound | G11B 27/3081 |
| 9,948,966 B1* | 4/2018 | Panchaksharaiah | H04N 21/44222 |
| 10,291,965 B2* | 5/2019 | Gerhards | H04N 21/84 |
| 10,296,159 B2* | 5/2019 | Hamlin | G06F 3/0481 |
| 10,341,723 B2* | 7/2019 | Benedetto | H04N 21/44204 |
| 10,440,436 B1* | 10/2019 | Taylor | H04N 21/234345 |
| 10,887,634 B2* | 1/2021 | Lin | G06F 21/84 |
| 2004/0006424 A1 | 1/2004 | Joyce et al. | |
| 2005/0246291 A1* | 11/2005 | Delgrosso | G06Q 20/40 705/67 |
| 2005/0289582 A1* | 12/2005 | Tavares | H04H 60/33 725/10 |
| 2006/0064383 A1* | 3/2006 | Marking | H04L 63/0428 705/57 |
| 2006/0171559 A1 | 8/2006 | Rhoads | |
| 2007/0033414 A1* | 2/2007 | Dunko | G06F 21/10 713/186 |
| 2007/0150517 A1 | 6/2007 | Malone | |
| 2008/0092156 A1* | 4/2008 | Ferrone | H04N 21/44218 725/13 |
| 2009/0131764 A1* | 5/2009 | Lee | A61B 5/6803 600/301 |
| 2009/0133051 A1* | 5/2009 | Hildreth | H04N 21/4223 725/28 |
| 2009/0138805 A1* | 5/2009 | Hildreth | H04N 21/4223 715/745 |
| 2009/0249223 A1* | 10/2009 | Barsook | H04N 7/15 715/753 |
| 2010/0027521 A1* | 2/2010 | Huber | H04W 4/40 370/338 |
| 2010/0052852 A1* | 3/2010 | Mohanty | G07C 9/257 340/5.83 |
| 2010/0198876 A1 | 8/2010 | Estok | |
| 2010/0201498 A1* | 8/2010 | Griffin | G06F 21/32 340/10.52 |
| 2010/0207874 A1* | 8/2010 | Yuxin | G09F 27/00 345/156 |
| 2010/0251295 A1* | 9/2010 | Amento | H04N 21/475 725/38 |
| 2011/0069940 A1* | 3/2011 | Shimy | H04N 21/44218 386/296 |
| 2011/0173662 A1* | 7/2011 | Beppu | H04N 21/44218 725/46 |
| 2012/0030637 A1* | 2/2012 | Dey | G06F 3/0304 715/863 |
| 2012/0060176 A1* | 3/2012 | Chai | H04N 21/44218 725/10 |
| 2012/0072420 A1 | 3/2012 | Moganti et al. | |
| 2012/0090000 A1* | 4/2012 | Cohen | G11B 27/034 725/32 |
| 2012/0154557 A1* | 6/2012 | Perez | H04N 21/47205 348/53 |
| 2012/0278331 A1* | 11/2012 | Campbell | H04N 21/44204 707/740 |
| 2013/0016910 A1* | 1/2013 | Murata | H04N 21/8583 382/195 |
| 2013/0063548 A1* | 3/2013 | Rosenberg | H04N 7/15 348/14.09 |
| 2013/0076853 A1* | 3/2013 | Diao | H04N 7/157 348/14.08 |
| 2013/0147705 A1* | 6/2013 | Lee | G06F 21/32 345/156 |
| 2013/0167168 A1* | 6/2013 | Ellis | H04N 21/25891 725/12 |
| 2013/0169546 A1* | 7/2013 | Thomas | G06F 3/04883 345/173 |
| 2013/0194177 A1* | 8/2013 | Sakata | H04N 21/44218 345/156 |
| 2013/0205314 A1* | 8/2013 | Ramaswamy | H04N 21/44218 725/14 |
| 2013/0251216 A1 | 9/2013 | Smowton et al. | |
| 2014/0010367 A1* | 1/2014 | Wang | H04N 21/4122 380/210 |
| 2014/0032924 A1* | 1/2014 | Durham | G06F 21/10 713/186 |
| 2014/0067828 A1* | 3/2014 | Archibong | G06F 3/0481 707/748 |
| 2014/0078039 A1* | 3/2014 | Woods | H04N 21/442 345/156 |
| 2014/0089017 A1* | 3/2014 | Klappert | G06Q 10/02 705/5 |
| 2014/0150002 A1* | 5/2014 | Hough | H04N 21/2668 725/9 |
| 2014/0161326 A1 | 6/2014 | Ganong et al. | |
| 2014/0168056 A1* | 6/2014 | Swaminathan | G06F 3/147 345/156 |
| 2014/0363059 A1* | 12/2014 | Hurewitz | G06Q 30/0201 382/118 |
| 2015/0030212 A1 | 1/2015 | Cavanagh et al. | |
| 2015/0110471 A1* | 4/2015 | Zheng | H04N 1/00336 386/291 |
| 2015/0178915 A1 | 6/2015 | Chatterjee et al. | |
| 2015/0269418 A1 | 9/2015 | Johnson et al. | |
| 2016/0021412 A1* | 1/2016 | Zito, Jr. | H04N 21/488 725/13 |
| 2016/0037217 A1* | 2/2016 | Harmon | H04N 21/4756 725/9 |
| 2016/0057497 A1* | 2/2016 | Kim | H04N 21/42203 725/10 |
| 2016/0219319 A1* | 7/2016 | Servignat | H04N 21/42204 |
| 2016/0334868 A1* | 11/2016 | Pacheco | G06K 9/0061 |
| 2016/0366203 A1* | 12/2016 | Blong | H04L 51/32 |
| 2017/0006322 A1* | 1/2017 | Dury | A63F 13/49 |
| 2017/0083831 A1* | 3/2017 | Ghosh | G06Q 10/06 |
| 2017/0094216 A1 | 3/2017 | Ekambaram et al. | |
| 2017/0161439 A1* | 6/2017 | Raduchel | H04W 12/06 |
| 2017/0264920 A1* | 9/2017 | Mickelsen | H04N 21/44008 |
| 2018/0189469 A1 | 7/2018 | Nam | |
| 2018/0189583 A1 | 7/2018 | Wohlken et al. | |
| 2018/0211100 A1 | 7/2018 | Mintz | |
| 2019/0075359 A1* | 3/2019 | Boss | H04L 67/306 |
| 2019/0147185 A1* | 5/2019 | Cai | G06F 21/6245 726/30 |
| 2019/0238719 A1* | 8/2019 | Alameh | H04W 12/02 |
| 2019/0278895 A1* | 9/2019 | Streit | G06F 21/602 |
| 2019/0305978 A1* | 10/2019 | Ramirez | H04N 21/42201 |
| 2020/0059703 A1* | 2/2020 | Sonare | G06F 16/583 |

OTHER PUBLICATIONS

Indian Office Action dated May 27, 2020, issued in Indian Patent Application No. 201811030895.

Extended European Search Report dated Apr. 19, 2021, issued in European Patent Application No. 19849268.8-1208.

* cited by examiner

FIG. 4

| ID | FINGERPRINT | IRIS | RETINA | FACIAL THERMOGRAM | HAND VEIN | EARS | FACE | MOBILE PHONE NUMBER | CONTENT LIST |
|---|---|---|---|---|---|---|---|---|---|
| P01245 | ✓ | ✓ | | | | | | 987xxxxxx | 🖼️ |
| P69985 | ✓ | ✓ | | | ✓ | | | | 🖼️ |
| P87562 | ✓ | | | ✓ | | | ✓ | | 🖼️ |
| P87221 | | | | | | ✓ | | | 🖼️ |
| P59845 | | | ✓ | | | | ✓ | 975xxxxxx | 🖼️ |

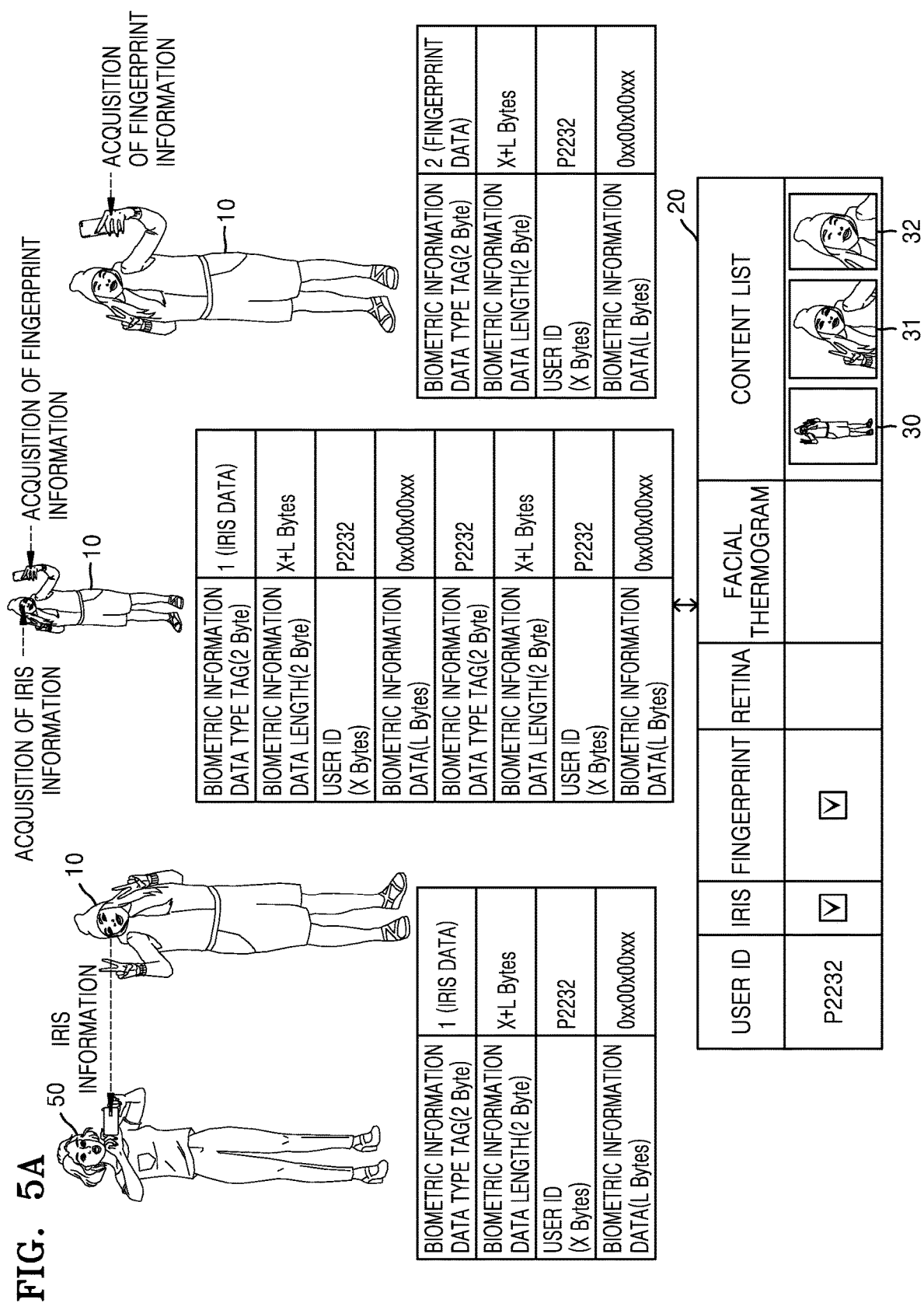

FIG. 13
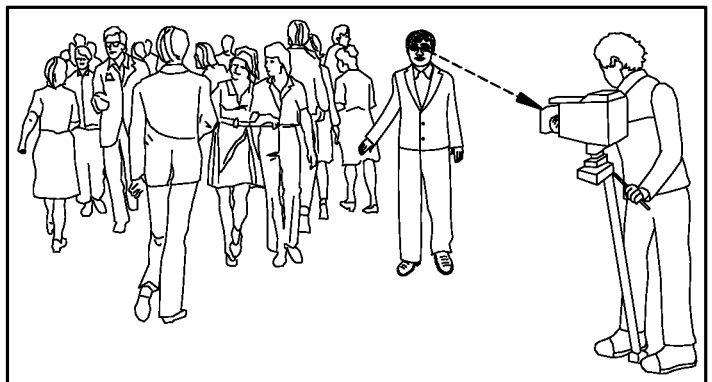
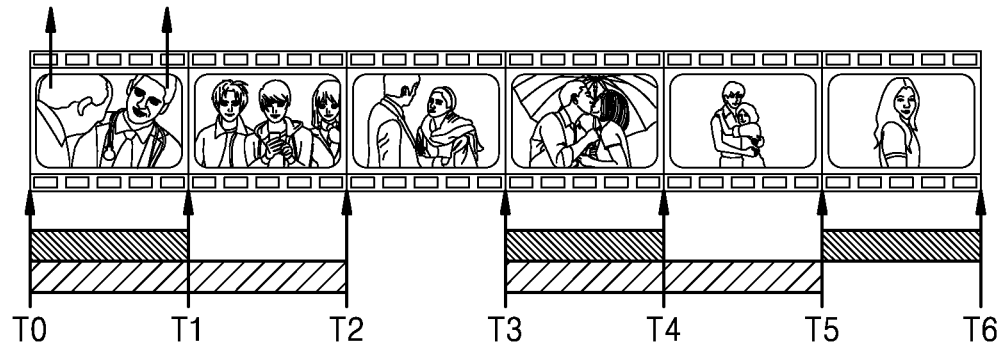
| USER ID | IRIS | FINGERPRINT | RETINA | HAND VEIN | TIME INFORMATION |
|---|---|---|---|---|---|
| P1234 | ✓ | | | ✓ | [{T0,T1};{T3,T4};{T5,T6}] |
| P4321 | ✓ | | | ✓ | [{T0,T2};{T3,T5}] |

METHOD AND DEVICE FOR GENERATING CONTENT

CROSS-REFERENCE TO RELATED APPLICATION(S)

This application is based on and claims priority under 35 U.S.C. § 119 of an Indian patent application number 201811030895, filed on Aug. 17, 2018, in the Indian Patent and Trademark Office, and of a Korean patent application number 10-2019-0042183, filed on Apr. 10, 2019, in the Korean Intellectual Property Office, the disclosure of each of which is incorporated by reference herein in its entirety.

BACKGROUND

1. Field

The disclosure relates to methods and devices for generating content. More particularly, the disclosure relates to a method and device for generating content including a user identification.

2. Description of Related Art

With developments in multimedia technology and networking technology, users have been able to obtain and use various types of data through various devices. Moreover, a user identification technique has been developed for a user to effectively use content including himself or herself. There is a demand for a technique for effectively providing a user with content that the user wants by accurately identifying the user.

Biometrics, which is one of biometric recognition techniques, involves recognizing a person by using biometric information based on one or more pieces of unique physiological and behavioral characteristics. Examples of the biometric information may include an iris, a retina, and a fingerprint. The biometric information may be unique information of a user, and may be unique characteristics that do not vary according to time. Accordingly, use of the biometric information may enable effective distinguishment between persons. Thus, the biometric information may be used to effectively provide a user with content that the user wants.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device capable of increasing the convenience of a user who generates and uses content.

Another aspect of the disclosure is to provide a method and a device capable of generating content by using biometric information of a user.

Another aspect of the disclosure is to provide a method and a device capable of generating content including a user identification (ID) by using biometric information of a user.

Additional aspects will be set forth in part in the description which follows and, in part, will be apparent from the description, or may be learned by practice of the presented embodiments.

In accordance with an aspect of the disclosure, an operation method of a device is provided. The operation method includes obtaining mapping information by making one or more pieces of biometric information for each of a plurality of users correspond to a user identification (ID) of each of the plurality of users, obtaining first content including a first user, by photographing the first user, obtaining first biometric information of the first user, determining a first user ID corresponding to the first biometric information of the first user, based on the mapping information, associating the first content with the first user ID, and storing the association of the first content with the first user ID.

The first biometric information may include at least one of fingerprint information, iris information, retina information, facial thermogram information, or deoxyribonucleic acid (DNA) information.

The determining of the first user ID may include, when the first user is included in the plurality of users, determining the first user ID, based on the mapping information, and when the first user is not included in the plurality of users, generating a user ID of the first user and determining the generated user ID as the first user ID.

The obtaining of the first biometric information may include obtaining the first biometric information while the first user is being photographed.

The storing of the first content with the first user ID may include inserting the first user ID into metadata of the first content or a header of the first content.

The mapping information may include an association table in which the one or more pieces of biometric information for each of the plurality of users are matched with the user ID of each of the plurality of users.

The operation method may further include receiving one or more pieces of biometric information of the first user for a content request, determining the first user ID corresponding to the received one or more pieces of biometric information of the first user, based on the mapping information, and providing a content list including the first user, based on the determined first user ID.

The content list may include the first content associated with the first user ID.

The providing may include receiving content associated with the first user ID from an external device or a server and providing the received content.

In accordance with another aspect of the disclosure, a device is provided. The device includes a transceiver, at least one memory storing one or more instructions, and at least one processor configured, by executing the one or more instructions to control the device, to obtain mapping information by making one or more pieces of biometric information for each of a plurality of users correspond to a user identification (ID) of each of the plurality of users, obtain first content including a first user by photographing the first user, obtain first biometric information of the first user, determines a first user ID corresponding to the first biometric information of the first user, based on the mapping information, and associate the first content with the first user ID and store the association of the first content with the first user ID.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a table in which mapping information is stored according to an embodiment of the disclosure;

FIG. 5A is a view for explaining a method, performed by a device, of updating mapping information according to an embodiment of the disclosure;

FIG. 13 is a view for explaining a method, performed by a device, of generating video content associated with a user identification (ID) according to an embodiment of the disclosure;

Throughout the drawings, like reference numerals will be understood to refer to like parts, components, and structures.

DETAILED DESCRIPTION

Figure 1:
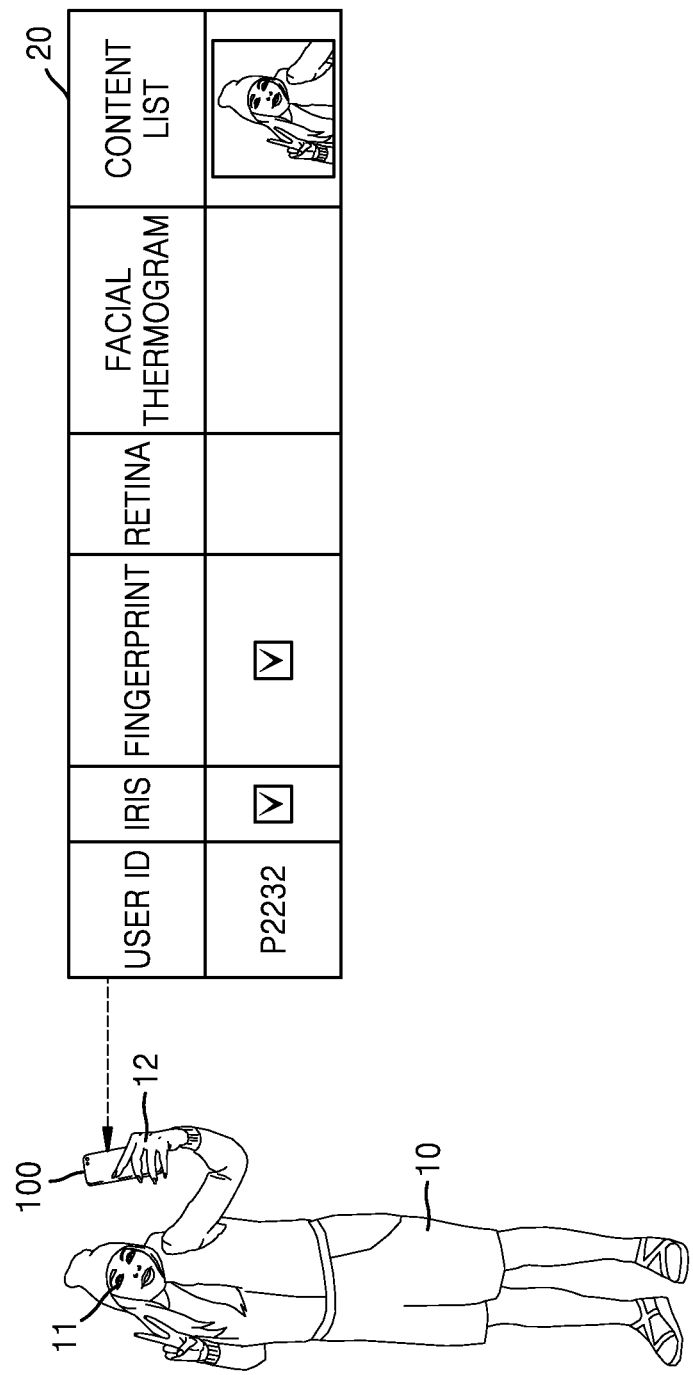
FIG. 1 is a view for explaining a method, performed by a device, of obtaining mapping information according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Thus, the expression "according to some embodiments" or "according to an embodiment" used in the entire disclosure does not necessarily indicate the same embodiment.

Some embodiments of the disclosure may be described in terms of functional block components and various processing operations. Some or all of such functional blocks may be realized by any number of hardware and/or software components configured to perform the specified functions. For example, functional blocks according to the disclosure may be realized by one or more processors or microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of techniques of the related art for electronics configuration, signal processing and/or control, data processing and the like. The words "module" and "configuration" are used broadly and are not limited to mechanical or physical embodiments of the disclosure.

Furthermore, the connecting lines or connectors between components shown in the various figures presented are intended to represent functional relationships and/or physical or logical couplings between the components. Connections between components may be represented by many alternative or additional functional relationships, physical connections or logical connections in a practical device.

The expression "at least one of A and B" indicates "A or B" or "A and B".

Throughout the disclosure, the expression "at least one of a, b or c" indicates only a, only b, only c, both a and b, both a and c, both b and c, all of a, b, and c, or variations thereof.

The term "content" used herein may include multimedia content capable of visually representing a captured subject, such as image content (e.g., a photo) or video content.

The term "user" used herein denotes a person who controls a function or operation of a device. Examples of the user may include a person photographed by the device.

The term "biometric information" used herein denotes information representing body characteristics of a user, and may include information about an iris, a retina, deoxyribonucleic acid (DNA), a voice, a facial thermogram, a facial expression, a fingerprint, a hand vein, and the like, each of which may differ for different users.

Identification of users in computer vision is a method of uniquely identifying a user in the set of images and video sequences (in general, multimedia content). When a user included in content is identified, it is difficult to accurately distinguish persons captured in an image or video content from each other. In detail, there is a problem associated with a plurality of factors related with a subject, such as look-alike persons (twins), view point variances, occlusion, shape and size variances etc.

Methods for identification and recognition of users in content may be broadly divided in three categories. (1) Feature based methods, in which an image is processed and features may be extracted from a person-detected image. These features may be used to classify and identify persons in image/video. The feature based methods may include an image processing method and a person re-identification method. (2) Tag based methods, in which captured image/video may be post-processed and some informative tags such as the name and profession of a person may be added to the image/video manually. (3) Context based methods, in which context of the image/video may be captured. Based on these contexts, the context based methods may try to recognize or identify the persons present in the video or image. Content-based image retrieval is one of the context based methods.

In the tag and context based methods, additional informative data may be associated with the image/video either at the time of capturing a picture or during processing the captured picture. Different type of additional data may be associated with the captured image/video. Various categories of data or information associated with the picture or video includes (1) personal volatile data: This is the personal data of individuals present in the captured image/video. Examples of the personal volatile data may include a body temperature, a heart rate, a galvanic skin response (GSR), a facial expression, a glucose level, and hydration. (2) Technical information: These are the technical information of capturing devices. Examples of the technical information may include an image time stamp, a shutter speed, an aperture, and a lens focal length. (3) Dependent data: Dependent data may be computed from the other data associated with an image. The dependent data may be computed while capturing a picture. Examples of the dependent data may include an emotion, a mood, and the like. (4) Extracted data: This data may be extracted from an input picture or video. The extracted data may include features, such as a color, a texture, and object's placement. (5) Object description: This object description data may include additional information of the objects present in a picture. Examples of the object description data may include video, audio, voice, spoken words, instruments, and scene.

State of the art provides various methods for person identification in an image/video file. (1) Content Based Image Retrieval (CBIR): Content-based image retrieval which analyzes the contents of an image rather than meta-data such as keywords, tags, or descriptions associated with the image. The term "content" in this context may refer to colors, shapes, textures, or any other information that may be derived from the image itself. According to this method, visual features for a contents-based system may be extracted from the image itself. CBIR may be categorized based on the type of features used for retrieval which could be either low level or high level features. All images may undergo a low level feature extraction process before being added to an images database. In a feature extraction stage, features such as a color, a shape or a texture may be extracted from the image. A user may provide a sample image, and a similarity measurement engine may estimate similarities between a query image and database images and then rank the similarities according to their similarity to a given query image. (2) Image processing: This method may involve a transformation function or system. An input image may be processed through a corresponding transformation function and then compared with database images (processed through the same transformation function) to recognize, identify or re-identify the objects in an image. Other methods of image processing are background matching, learning features through neural networks, etc. In image processing, a recognition system may classify an unknown input pattern into a set of pre-specified class. This task may be fairly easy when the number of classes is small and the members in the same class are almost exactly same. However, this task becomes difficult when the number of classes is large and the members in the same class can look very different. This method deals with recognition of general objects, but it does not consider recognition of a particular person or object in the picture. (3) Image tagging: This method may involve generation of a dataset in which objects in an image are tagged manually by users or by database creators. Feature based methods may use feature engineering to generate features that can differentiate different objects. Tagging an object in a captured image may need a manual work which makes tagging efficient. Identifying features from an image and adding a meaningful description may make image tagging be a more tedious task. Tagged information does not ensure the percent accuracy of a result, because the same information may be used to tag multiple images.

None of the above existing methods accurately address the below problems. (a) Appearance of living objects changes with the course of time. For example, the visual appearance of a person changes with the course of time. For example, a person at the age of 16 years may look different from when the person attains the age of 30. When two pictures of the same person in different ages are provided, none of the existing methods gives the assurance to identify that the same person is present in both images. (b) In reality, twins have similar appearances. Both the persons have the same features. Some twins are so alike that humans also find it difficult to distinguish them. Therefore, the existing methods of object classification and recognition, such as content-based image retrieval and image tagging, failed to claim the accurate identification of twins. (c) Privacy while viewing a gallery is a very important concern. Usually all the pictures of a user are visible in the gallery even when multiple peoples view the gallery together. Existing methods do not provide a method of ensuring privacy of user's multimedia files. (d) Security of user's image/video files is not ensured by the above methods. There are many cases in the news of photos and video leaks from databases of even very big companies storing the user's images/video files. An image/video file is data which is very personal to a user. The security of image/video data needs to be ensured, even when none of the above methods provide a way to ensure that security. (e) Social media has become a huge platform for interacting and sharing image/video files with other people.

Unauthorized sharing of a user's photo/video file may be a serious issue. None of the methods provide a way to have a check on unauthorized sharing of photos of a user. (f) No association among tags of the same person is provided in different image/video files. In image tagging methods, tags are provided in persons' image/video files. The same person may have different tags in different images. There is need for a method to provide association among tags.

All the existing methods are not able to address the aforementioned problems. Hence, there is a need for a method of efficiently and accurately identifying a person, ensure the privacy and security of captured multimedia content, irrespective of the aforementioned complexities.

The disclosure will now be described more fully with reference to the accompanying drawings, in which various embodiments are shown.

FIG. 1 is a view for explaining a method, performed by a device of obtaining mapping information according to an embodiment of the disclosure.

Referring to FIG. 1, when a user 10 takes a selfie by using a device 100, the device 100 may obtain iris information 11 and fingerprint information 12 of the user 10. A selfie refers to a self-portrait photo of a person taken when the person looks at a camera or a mirror. In other words, while the user 10 is taking a picture to generate content, the device 100 may obtain biometric information of the user 10 by using a camera or sensors (not shown) of the device 100.

The device 100 may obtain mapping information 20 in which the iris information 11 and the fingerprint information 12 of the user 10 correspond to a user identification (ID) P2232 of the user 10. In detail, when the device 100 obtains biometric information of the user 10, the device 100 may store the mapping information 20 in the form of a table in a memory (not shown) of the device 100. Referring to FIG. 1, the mapping information 20 may associate iris information, fingerprint information, retina information, facial thermogram information, and a content list with user ID of the user 10 and store a result of the association. For example, when the user 10 takes a selfie by using the device 100, the device 100 may store the iris information 11, the fingerprint information 12, and selfies obtained during photographing, in the form of mapping information obtained by associating the iris information 11, the fingerprint information 12, and the selfies with the user ID P2232.

Figure 2:
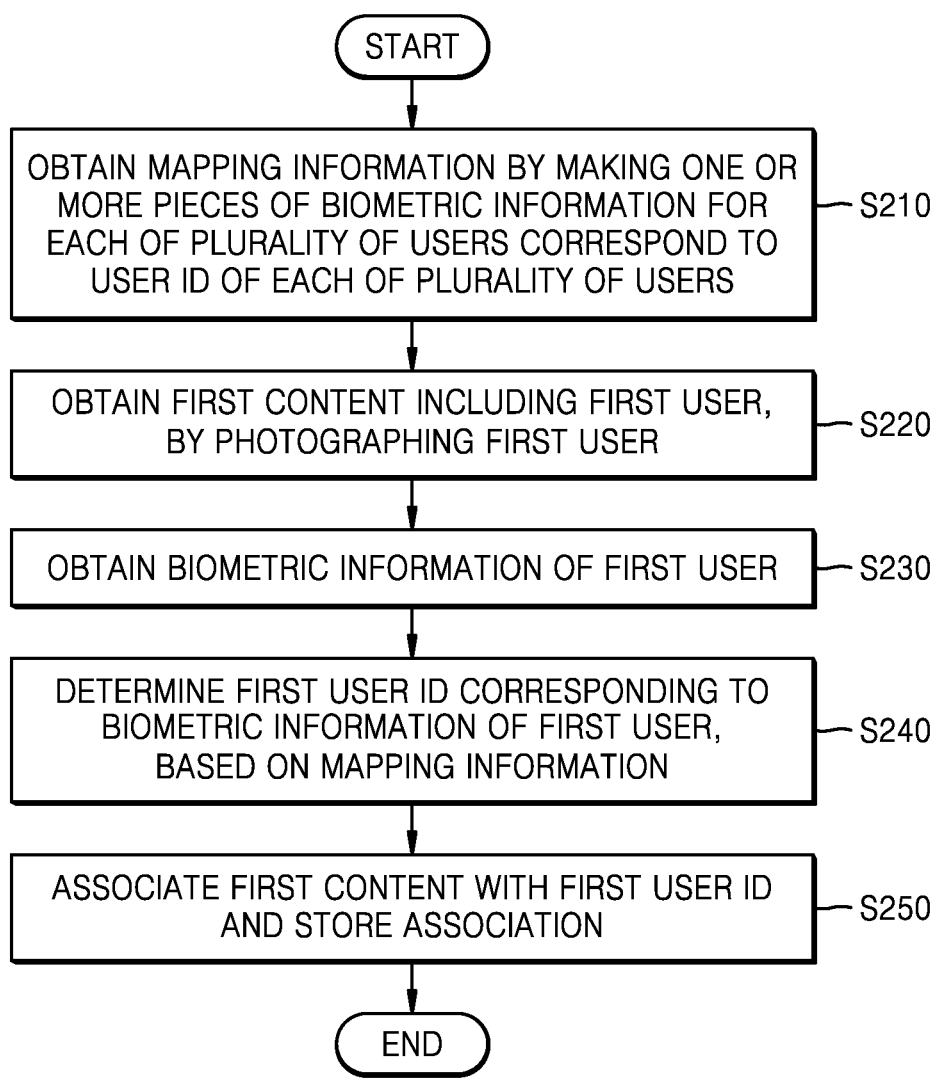
FIG. 2 is a flowchart of a method, performed by a device, of generating content, based on biometric information of a user according to an embodiment of the disclosure.

FIG. 2 is a flowchart of a method, performed by a device of generating content by using biometric information of a user according to an embodiment of the disclosure.

Referring to FIG. 2, in operation S210, the device 100 may obtain mapping information by making one or more pieces of biometric information for each of a plurality of users correspond to user ID of each of the plurality of users. In detail, the device 100 may retrieve mapping information pre-stored in the memory, or may receive mapping information from an external device or a sever through a network.

In operation S220, the device 100 may obtain first content including a first user, by photographing the first user. In detail, the device 100 may photograph the first user by using a camera, and accordingly may obtain a photo or moving picture including an image of the first user.

In operation S230, the device 100 may obtain biometric information of the first user. In detail, the device 100 may obtain the biometric information of the first user while photographing the first user. For example, when the device 100 photographs the first user by using a camera, the device 100 may obtain biometric information of the first user, such as iris information, retina information, and a facial thermogram of the first user. The device 100 may obtain the biometric information of a user by using sensors (e.g., an infrared (IR) sensor and a fingerprint recognition sensor) included in the device 100. For example, when the device 100 includes a fingerprint recognition sensor, the device 100 may obtain fingerprint information of a user by using a touch input of the user that is received while the user is being photographed.

When external devices (not shown) capable of obtaining biometric information are within a certain distance from the device 100, the device 100 may receive biometric information of a user obtained from the external devices.

In operation S240, the device 100 may determine first user ID corresponding to the biometric information of the first user, based on the mapping information. In detail, when the first user is included in the plurality of users, the device 100 may determine the first user ID, based on the mapping information. On the other hand, when the first user is not included in the plurality of users, the device 100 may generate user ID of the first user and determine the generated user ID as the first user ID.

For example, when fingerprint information and iris information of the first user are associated with the first user ID (for example, P2232) and stored in the mapping information, the device 100 may obtain the fingerprint information or the iris information of the first user while photographing the first user, and may determine the user ID of the first user as P2232, based on the mapping information. On the other hand, when the biometric information of the first user is not included in the mapping information, the device 100 may generate the user ID of the first user and determine the generated user ID as the first user ID.

When mapping information associated with the first user is not stored in the device 100, namely, when the biometric information of the first user is not included in the mapping information, the device 100 may receive mapping information from an external device or a server.

In operation S250, the device 100 may associate the first content with the first user ID and store the association. The device 100 may embed or insert the first user ID into metadata or a header of the first content. In detail, the device 100 may store biometric information or ID of the people included in captured content in an external metadata file or the header of the content. The device 100 may use an extensible markup language (XML) or JavaScript Object Notation (JSON) as a format for storing external metadata. A method of embedding biometric information or ID into content will be described below.

Figure 3:
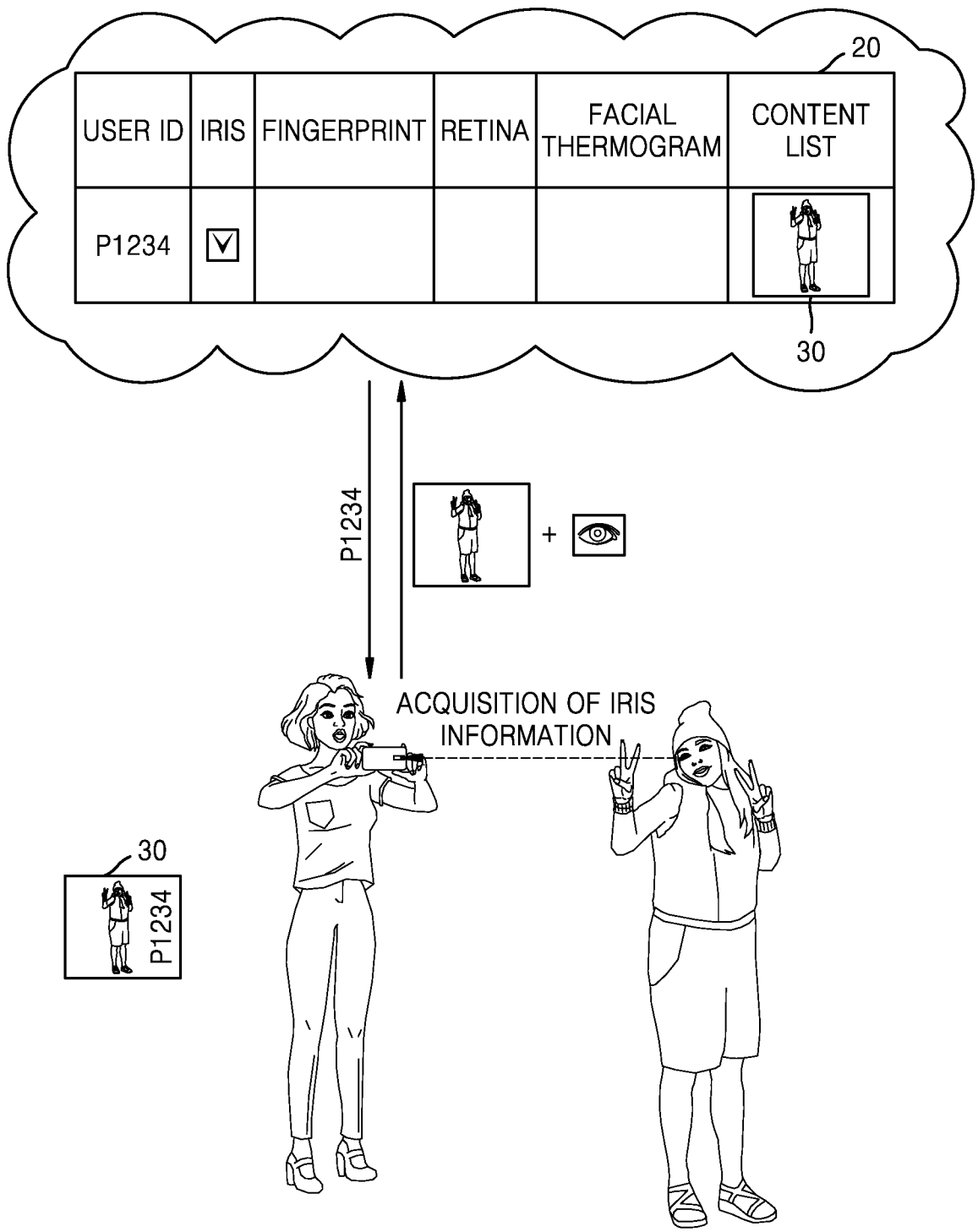
FIG. 3 is a view for explaining a method, performed by a device, of generating content, based on biometric information of a user according to an embodiment of the disclosure.

FIG. 3 is a view for explaining a method, performed by a device of generating content, based on biometric information of a user according to an embodiment of the disclosure.

Referring to FIG. 3, user B may photograph user A to obtain content 30 including user A. User B may perform photographing by using a camera, and the camera may be a digital or analog camera. A camera available to generate multimedia content may be a still camera which captures still photographs of objects, or may include the still camera. The camera may include a video camera which is used to capture moving videos of the objects. An infrared camera, i.e., a thermographic camera, may capture heat-sensed images by using infrared radiation, similar to a common camera that captures an image by using visible light. A cloud camera may be used to capture multimedia content in two dimensions (2D), and a point camera may be used to capture an image in three dimensions (3D) (i.e. including depth information of the image). Moreover, there are many other ways to capture multimedia content, such as taking screen shot, scanning or copying of an already captured image and cropping of the already captured image. Identification of a person may depend on the capability of a capturing device, a connected device, Internet to access an already-created database, and some manual inputs.

Referring to FIG. 3, the content 30 including user A and iris information of user A may be obtained using at least one of the aforementioned cameras. In detail, the content 30 including user A may be obtained by photographing user A. The iris information of user A may be obtained while user A is being photographed, or may be obtained by extracting iris information from obtained content.

The obtained content 30 and the obtained iris information of user A may be stored in correspondence with user ID P1234 of user A. One or more pieces of biometric information for each of a plurality of users stored in correspondence with user ID of each of the plurality of users will now be referred to as mapping information 20. The mapping information 20 may store biometric information of at least one person associated with multimedia content. In detail, when other biometric information of user A, for example, fingerprint information, retina information, or a facial thermogram, is additionally received, the device may store the received other biometric information of user A in correspondence with P1234 in the mapping information 20. In other words, the device may associate a plurality of pieces of user biometric information with user ID P1234. In this case, the mapping information 20 may be stored in the form of an association table. The mapping information 20 may be stored in the device, an external device, or a server.

The device may identify the user ID 21, i.e., P1234, corresponding to the obtained iris information of user A, based on the mapping information 20. The device may insert or embed the user ID 21 into the obtained content 30. The mapping information 20 may store content including the user ID 21 in a content list corresponding to P1234.

When the device embeds the user ID 21 into the content 30, the device may encrypt the iris information of user A or the user ID 21. The encrypted iris information of user A or the encrypted user ID 21 may be decrypted into other biometric information of user A associated with the user ID 21.

FIG. 4 is a table in which mapping information is stored according to an embodiment of the disclosure.

Referring to FIG. 4, the mapping information 20 may store unique biometric information of a user in correspondence with ID of the user. The mapping information 20 may be stored in the form of a table as shown in FIG. 4, but various embodiments of the disclosure are not limited thereto. For convenience of explanation, the mapping information 20 stored in the form of a table will now be described, and a table in which mapping information is stored is referred to as an association table.

The biometric information of a user does not vary during the overall lifespan of the user, and may be unique characteristics of the user. Accordingly, the biometric information of users may be used to uniquely identify persons from content. The biometric information of a user may include pieces of information associated with a fingerprint, an iris, a retina, a facial thermogram, a hand vein, ears, a face, and the like, but various embodiments of the disclosure are not limited thereto. Table 1 below shows the characteristics of each biometric information.

TABLE 1

| User biometric information | Uniqueness | Performance | Circumvention |
| --- | --- | --- | --- |
| Fingerprint | HIGH | HIGH | LOW |
| IRIS | HIGH | HIGH | LOW |
| RETINAL SCAN | HIGH | HIGH | LOW |
| FACIAL THERMOGRAMS | HIGH | MEDIUM | LOW |
| DNA | HIGH | HIGH | HIGH |

Pieces of biometric information associated with a fingerprint, an iris, a retina, a facial thermogram, and DNA included in the biometric information of a user may be pieces of information having high uniqueness, and accordingly, may have high performance, namely, a high user identification probability.

According to an embodiment of the disclosure, pieces of information associated with a hand vein, ears, and a face may vary according to the time, and may have lower uniqueness than pieces of information associated with a fingerprint, an iris, a retina, a facial thermogram, and DNA, and thus may be subsidiarily used to identify a user.

The biometric information of a user according to an embodiment of the disclosure is not stored in an association table without changes for the safety of the biometric information of the user. In other words, the biometric information may be encoded or encrypted and then stored. There may be various methods for encrypting or encoding the biometric information as follows. (1) Fixed Length Key Encryption: A fixed length key encryption method involves transforming a biometric recognition template from a transformation function (F) to produce a fixed length key. The fixed length key may be used to encrypt the biometric information. Decryption may be performed through an encrypted key. A key may be generated again for decryption. A process of generating a key may include the operations when biometric information is transformed to a unique biometric template, and the biometric template may be passed through the same transformation function (F) to produce a key for decryption. (2) Variable Length Key Encryption: A variable length key encryption method involves using a unique biometric template itself as a key. Different pieces of biometric information may have different length templates. The same process as the process in the fixed length key encryption may be performed for encryption as well as decryption. (3) Single key encryption—decryption of multiple keys: This method may involve use of a single key for encryption of biometric information. This key may be generated by combining and transforming different/same pieces of biometric information of the objects included in multimedia content. Decryption in this method may be performed by any of the pieces of biometric information of the objects in the multimedia content. A method of generating a key for encryption involves taking all the pieces of biometric information of the objects identified in the multimedia content and merging the pieces of biometric information with a special combination of flags like 0xFFFFFFFF to separate them from each other. The information included in the multimedia content may be encrypted using the above method. When biometric information is provided by at least one of the users identified in the multimedia content to perform decryption, the provided biometric information may be matched with the generated key, based on the values filled between the flags. When the biometric information is matched, the multimedia content may be decrypted. In the encryption technique, every type of biometric information may be encrypted using the Advanced Encryption Standard (AES) 128 encryption standard. The encrypted biometric information may be embedded into the multimedia content. For biometric information for single 128/256 bit ID encryption, the encryption technique may encrypt user ID of variable lengths to single encrypted ID. The ID may be stored in an ID column in the association table.

According to an embodiment of the disclosure, the device may capture multimedia content. The device may extract the biometric information of a user in the multimedia content and may insert the extracted biometric information into a person biometric information stack. The person biometric information stack may be a stack of biometric information lists of all users detected in the multimedia content. The person biometric information stack may be sent to a server by the device together with user ID.

According to an embodiment of the disclosure, the association table may be a table in which biometric information and ID of each user are associated with each other and stored. For example, the device may extract and store biometric information of at least one person associated with content included in a content list within the association table. The device may map biometric information of a user obtained when photographing the user, with captured content, and store the mapping within the association table. For example, the fingerprint information and the iris information of user A may be interlinked with ID P01245 of user A and may be stored.

According to an embodiment of the disclosure, the device may map biometric information of a user within the association table with single 128/256 bit user ID. User ID may be unique person ID (unique 128/256 bit key). Pieces of received user biometric information may be interlinked to each other through person ID previously stored in the association table. Accordingly, the pieces of received user biometric information may be searched from the association table. A method, performed by the device, of searching for user-related content will be described below. All the pieces of received biometric information may be mapped to user ID and stored in the association table.

When user ID corresponding to received biometric information is not included in the association table, new user ID corresponding to the received biometric information may be generated. The generated user ID may be mapped with the received biometric information and stored in the association table. For example, when the biometric information of user A is obtained and ID corresponding to user A is not included in the association table, the device may generate new ID and determine the generated ID as the ID of user A. The device may associate the biometric information of user A with the generated ID and store the association. An operation of associating the biometric information of a user with user ID and storing the association may be performed by not only the device but also an external device or a server.

Referring to FIG. 4, the columns of the association table may be used to store encoded or encrypted biometric information of users, ID of the users, and references of pieces of content. The association table may further include other unique numbers, such as bank account numbers, mobile phone numbers, and passwords, to be used as additional information for identifying the users, in addition to the biometric information of the users. According to an embodiment of the disclosure, when the device fails to obtain biometric information of a user, the association table may include additional information manually obtained by the user.

FIG. 5A is a view for explaining a method, performed by a device of updating mapping information according to an embodiment of the disclosure.

Referring to FIG. 5A, the mapping information 20 may be updated by first content 30, second content 31, and third content 32 included in a content list. Referring to FIG. 5A, in the first content 30, the second content 31, and the third content 32, biometric information may be divided into four parts and stored. In detail, biometric information data of joint photographic experts group (JPEG) file type may include a biometric information data type tag (e.g., iris data or fingerprint data), a biometric information data length, user ID (ID of a user associated with data), and biometric information data. The biometric information data may be encrypted data.

The biometric information of a user may be embedded to an external metadata file, and it is not necessary that metadata is always stored in the header of a multimedia content file. In other words, metadata of multimedia content may be stored as a separate file outside the multimedia content file. There are various formats in which metadata is stored in an external file. For example, a JSON format, an XML format, or a Binary format may be a format in which metadata is stored in an external file. Biometric information or user ID may be embedded into the header of the multimedia content file. To extract pieces of biometric information of persons from the multimedia content file, the moving picture experts group (MPEG)-4 standard may allow to store additional information in the header of an mp4 file. Accordingly, a metadata section which allows storing of additional data such as biometric information or ID in an XML format may exist in the header. Binary XML may be another format for storing metadata.

Referring to FIG. 5A, a first user 10 may take a selfie, and a second user 50 may consider a situation where the first user 10 is photographed.

First Content 30:

When the second user 50 photographs the first user 10, the device may obtain iris information of the first user 10, and may store the obtained iris information in the first content 30. At this time, the device may update the mapping information 20 by storing the obtained iris information in correspondence with the user ID P2232 of the first user 10.

Second Content 31:

While the first user 10 is taking a selfie, the device may obtain the iris information and fingerprint information of the first user 10. The device may store the obtained iris information and the obtained fingerprint information in the second content 31. At this time, the device may update the mapping information 20 by storing the fingerprint information, in addition to the iris information obtained during capturing of the first content 30, in correspondence with the user ID P2232 of the first user 10.

Third Content 32:

Even when the first user 10 takes a selfie with her eyes closed, when the device obtains the fingerprint information of the first user 10, the device may embed or insert the user ID P2232 of the first user 10 into the third content 32, based on the obtained fingerprint information. In other words, based on at least one piece of obtained biometric information, the device may obtain corresponding user ID, and may update mapping information.

Figure 5B:
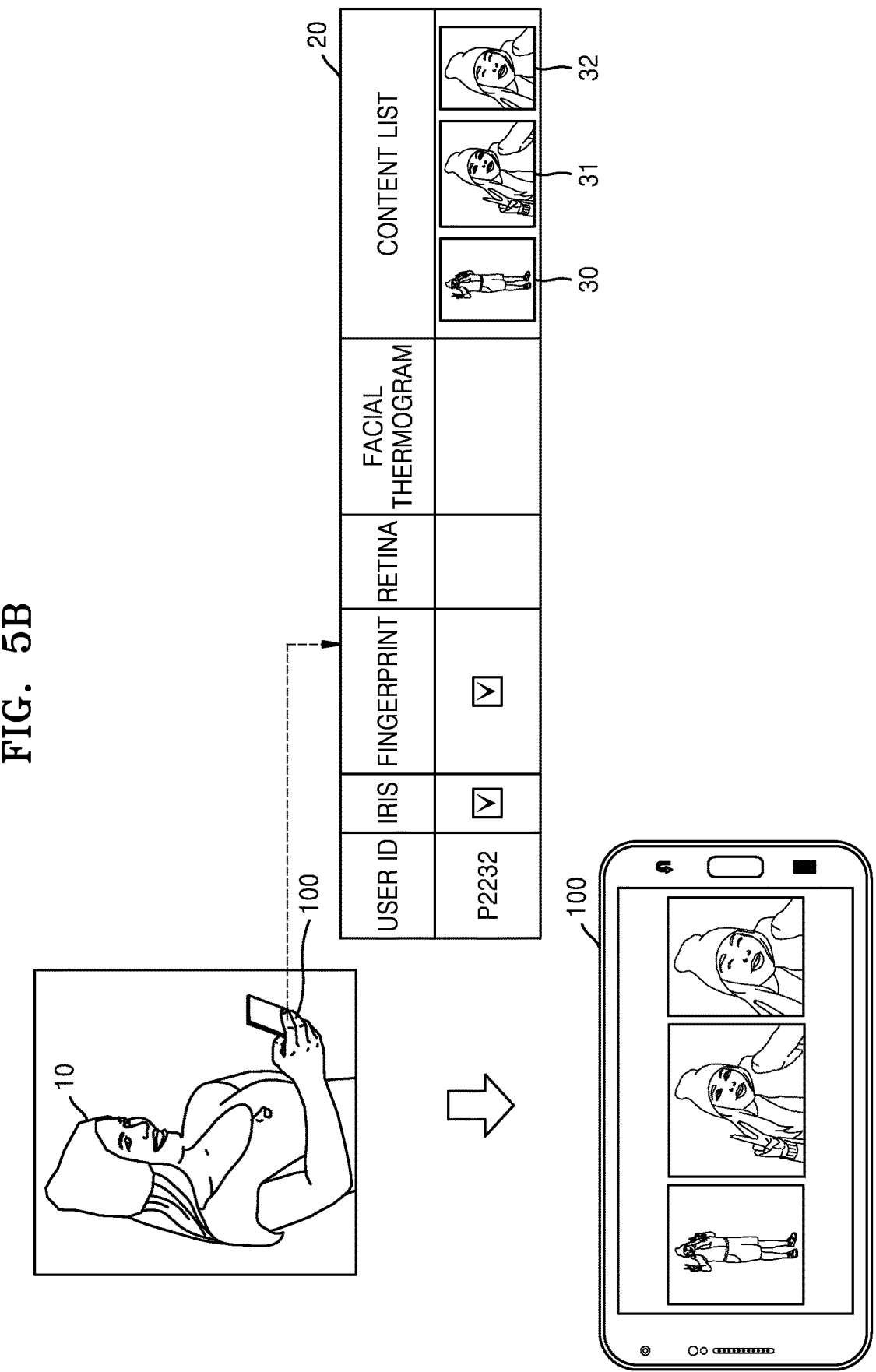
FIG. 5B is a view for explaining a method, performed by a device, of obtaining content including a user according to an embodiment of the disclosure.

FIG. 5B is a view for explaining a method, performed by a device of obtaining content including a user according to an embodiment of the disclosure.

Even when the first user 10 provides only one of fingerprint information or iris information to the device 100, the device 100 may provide the first content 30, the second content 31, and the third content 32 of the first user 10 to the first user 10 by using the association table. Referring to FIGS. 5A and 5B, the device 100 may also receive photos taken by an external device from the external device or a server by using the mapping information 20. In detail, even when the first user 10 provides only the fingerprint information, the device 100 may provide the first content 30, the second content 31, and the third content 32 interlinked with the user ID P2232 of the first user 10 matched with the fingerprint information in the mapping information 20.

Figure 6:
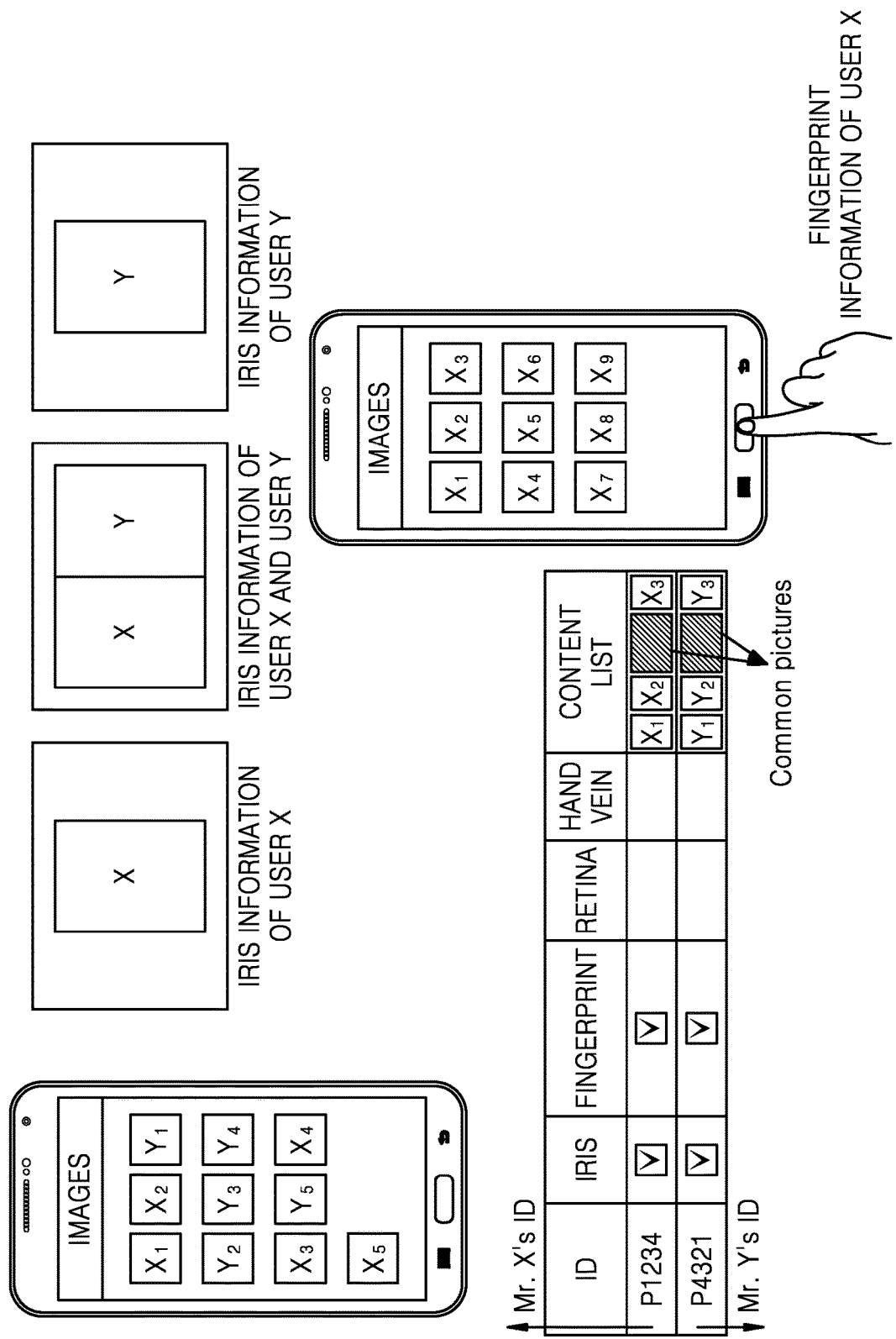
FIG. 6 is a view for explaining a method, performed by a device, of displaying content including a first user according to an embodiment of the disclosure.

FIG. 6 is a view for explaining a method, performed by a device of displaying content including a first user according to an embodiment of the disclosure.

Referring to FIG. 6. the device may store multimedia content including user X or user Y in a gallery. At this time, the device may store biometric information of user X and biometric information of user Y in the association table such that the pieces of biometric information of user X and user Y may correspond to ID P1243 of user X and ID P4321 of user Y, respectively.

According to an embodiment of the disclosure, the device may receive fingerprint information of user X in order to display content including user X. The received fingerprint information may be matched in the association table within the device. Accordingly, the device may display, to user X, a list of multimedia content including user X or multimedia content including user X. In other words, when user X desires to watch content including himself or herself, user X only has to provide his or her own biometric information to the device.

Figure 7:
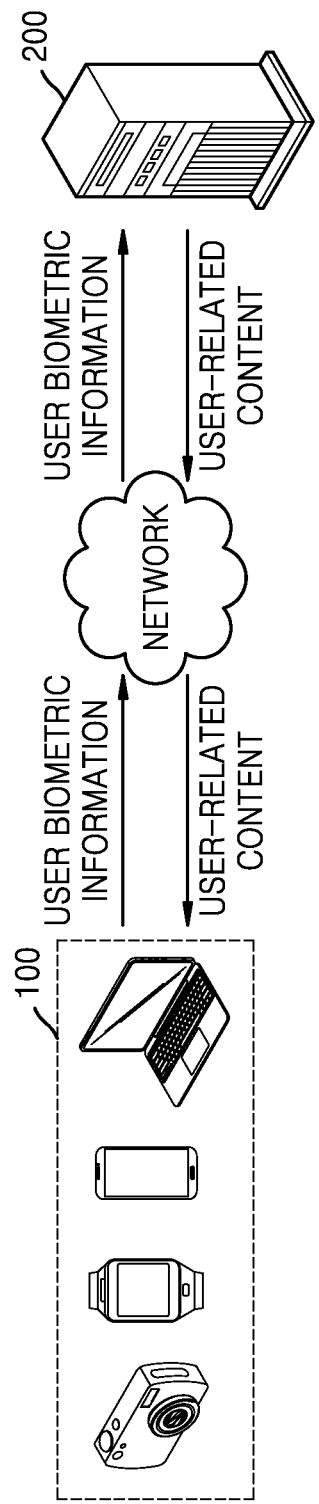
FIG. 7 is a view for explaining a system in which a device receives content according to an embodiment of the disclosure.

FIG. 7 is a view for explaining a system in which a device receives content according to an embodiment of the disclosure.

Referring to FIG. 7, the system may include the device 100 and a server 200.

The device 100 according to an embodiment of the disclosure may be realized in various types. Examples of the device 100 may include, but are not limited to, a digital camera, a smartphone, a laptop computer, a tablet personal computer (PC), an electronic-book terminal, a digital broadcasting terminal, personal digital assistants (PDAs), a portable multimedia player (PMP), a navigation device, and an MP3 player. The device 100 may also be a wearable device that is wearable by users. The wearable device may include, but are not limited to, at least one of an accessory type device (e.g., a watch, a ring, a wrist band, an ankle, a necklace, eyeglasses, a contact lens), a head-mounted-device (HMD), a fabric or clothing integrated device (e.g., electronic clothing), a body-attached device (e.g., a skin pad), or a bio-implant device (e.g., an implantable circuit). For convenience of explanation, a case where the device 100 is a smartphone will now be described.

The device 100 may communicate with the server 200 and an external device (not shown) via a network.

For example, the device 100 may transmit a message or user biometric information for requesting user-related content according to an embodiment of the disclosure via a network. The device 100 may receive user-related content from the server 200 via a network.

A communication system of the network may be wired or wireless communication, and may not be limited to a particular communication system. Examples of the communication system of the network may include not only communications networks (e.g., a mobile communications network, wired Internet, wireless Internet, and a broadcasting network) capable of being included in the network, but also short-range wireless communication with the device 100. For example, the network may include at least one network from among a personal area network (PAN), a local area network (LAN), a campus area network (CAN), a metropolitan area network (MAN), a wide area network (WAN), a broadband network (BBN), and the Internet. The network may include, but is not limited to, one or more networks from among a network topology including a bus network, a star network, a ring network, a mesh network, a star-bus network, a tree or hierarchical network, and the like.

The server 200 may communicate with the device 100 via a network, and may be implemented as at least one computer device. The server 200 may be distributed in a cloud type and provide a command, a code, a file, content, and the like.

The device 100 according to an embodiment of the disclosure may provide the server 200 with data that is necessary when the server 200 provides the user-related content. For example, the device 100 may provide biometric information or mapping information of a user to the server 200.

The server 200 according to an embodiment of the disclosure may instead perform operations that are executable by the device 100. For example, the server 200 instead of the device 100 may obtain the biometric information of a user from at least one piece of content. The server 200 may generate mapping information including the biometric information and the ID of a user, based on not only the content received from the device 100 but also all of the pieces of content received from an external device (not shown), and may provide the generated mapping information to the device 100.

Without being limited to the aforementioned example, the server 200 may perform various operations of the device 100 for generating content according to an embodiment of the disclosure, and transmit results of the operations to the device 100.

Figure 8:
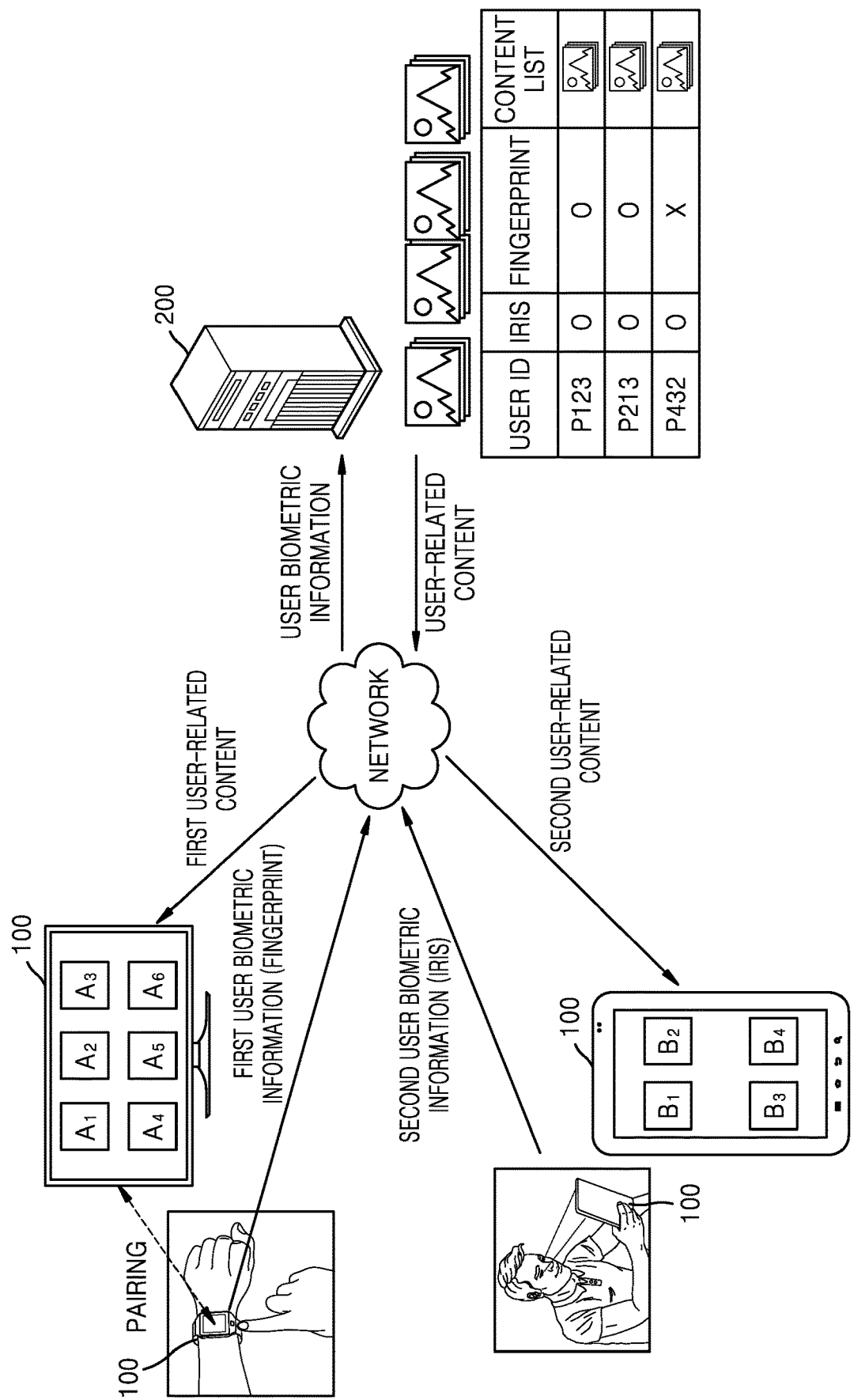
FIG. 8 is a view for illustrating, in detail, a system in which a device receives content according to an embodiment of the disclosure.

FIG. 8 is a view for illustrating, in detail, a system in which a device receives content according to an embodiment of the disclosure.

Referring to FIG. 8, as described above, the device 100 may be any of several types of electronic devices, such as a smart watch, a smart TV, a mobile phone, and a tablet PC. The device 100 may be paired with another type of device 100 due to user settings or the like to receive content. For example, a device 100 which receives a user input or biometric information for searching for user-related content may be of different type from a device 100 on which user-related content is displayed.

For example, when the device 100 is a smart watch, the smart watch may receive fingerprint information of a first user from the first user. The smart watch may transmit the fingerprint information of the first user to the server 200 via a network. The server 200 may transmit first user-related content to the device 100 by using mapping information including the fingerprint information of the first user. Referring to FIG. 8, a device 100 on which the first user-related content is displayed may be a smart TV paired with the smart watch.

Referring to FIG. 8, the device 100 may include a smartphone and a tablet PC, and the smartphone and the tablet PC may be paired with each other. The smartphone may obtain iris information of a second user and transmit the obtained iris information to the server 200 via a network. The server 200 may obtain second user ID corresponding to the iris information of the second user from mapping information, based on the received iris information of the second user. The server 200 may provide second user-related content to the tablet PC paired with the smartphone, based on a content list associated with the second user ID. The tablet PC may display the received second user-related content.

A method, performed by the device 100, of receiving user-related content from the server 200 is not limited to the aforementioned example. In detail, according to an embodiment of the disclosure, the device 100 may store mapping information within the device 100. Accordingly, the device 100 may obtain user ID corresponding to user biometric information obtained based on the mapping information stored in the device 100. The device 100 may receive content including the obtained user ID from the server 200, based on the obtained user ID.

Figure 9:
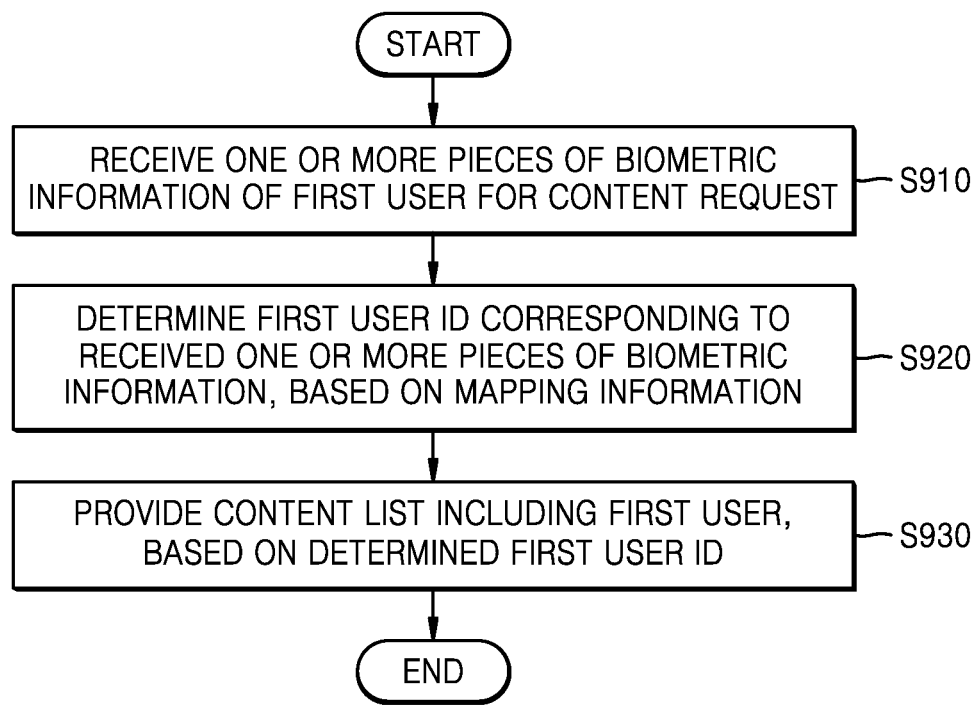
FIG. 9 is a flowchart of a method, performed by a device, of receiving content according to an embodiment of the disclosure.

FIG. 9 is a flowchart of a method, performed by a device of receiving content according to an embodiment of the disclosure.

Referring to FIG. 9, in operation S910, the device may receive one or more pieces of biometric information of a first user for a content request. The device may receive information for requesting multimedia content. The device may receive the one or more pieces of biometric information of the first user in order to identify the first user included in multimedia content shared through the Internet or the like. The device may search for the multimedia content including the first user by using the received one or more pieces of biometric information of the first user. Accordingly, the device may search for all of the selfies captured by the device but also selfies of the first user captured by an external device and shared. The device may receive the one or more pieces of biometric information of the first user in order to authenticate a user that receives multimedia content. The one or more pieces of biometric information may be received from not only the device but also an external device paired or connected with the device. The device may receive biometric information extracted from the multimedia content.

In operation S920, the device may determine first user ID corresponding to the received one or more pieces of biometric information, based on mapping information. In detail, the device may obtain user ID corresponding to the received one or more pieces of biometric information from the mapping information. When the first user ID corresponding to the received one or more pieces of biometric information is not found, the device may obtain biometric information of another first user.

In operation S930, the device may provide a content list including the first user, based on the determined first user ID. The device may render the provided content list.

Figure 10:
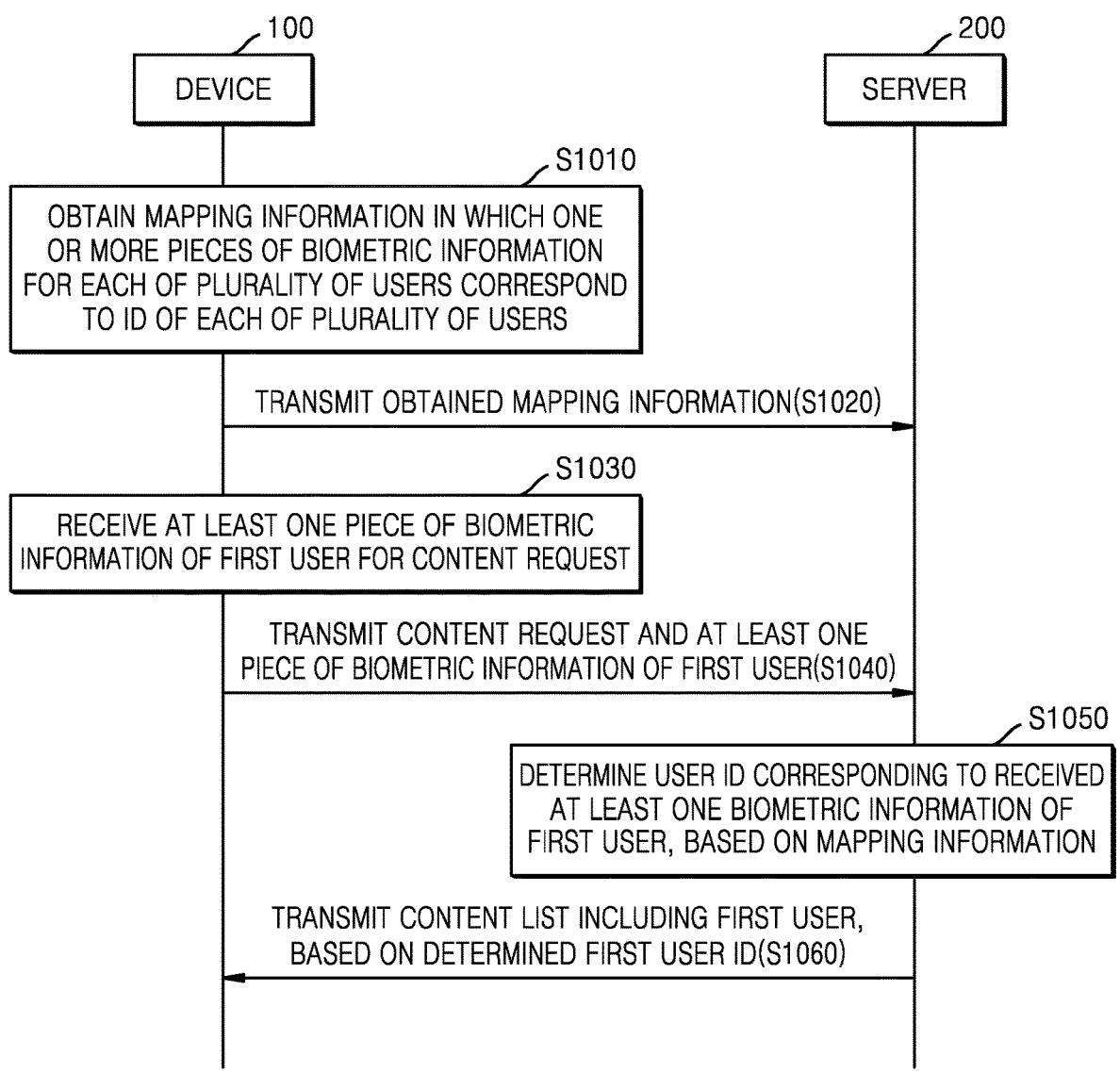
FIG. 10 is a flowchart of a method, performed by a device, of receiving content from a server according to an embodiment of the disclosure.

FIG. 10 is a flowchart of a method, performed by a device of receiving content from a server according to an embodiment of the disclosure.

Referring to FIG. 10, in operation S1010, the device 100 may obtain mapping information in which one or more pieces of biometric information for each of a plurality of users correspond to ID of each of the plurality of users. The device 100 may encrypt the received one or more pieces of biometric information, and may store mapping information in which the encrypted one or more pieces of biometric information correspond to the ID of each of the plurality of users.

In operation S1020, the device 100 may transmit the obtained mapping information to the server 200. The server 200 may store the mapping information received from the device 100, or may update mapping information previously stored in the server 200, based on the received mapping information.

In operation S1030, the device 100 may receive at least one piece of biometric information of a first user for a content request.

In operation S1040, the device 100 may transmit a content request and the at least one piece of biometric information of the first user to the sever 200. In detail, the device 100 may transmit a user input for a content request and the at least one piece of biometric information of the first user to the sever 200. For example, the device 100 may transmit a request for content including the first user and fingerprint information of the first user to the sever 200.

In operation S1050, the server 200 may determine user ID corresponding to the received at least one biometric information of the first user, based on the mapping information. In detail, the server 200 may search for biometric information corresponding to the biometric information of the first user from the mapping information, and determine user ID corresponding to found biometric information as ID of the first user, namely, first user ID. According to an embodiment of the disclosure, the server 200 may filter out or search for content associated with first user ID by determining first user ID corresponding to a matched column.

In operation S1060, the server 200 may transmit a content list including the first user to the device 100, based on the determined first user ID.

Figure 11:
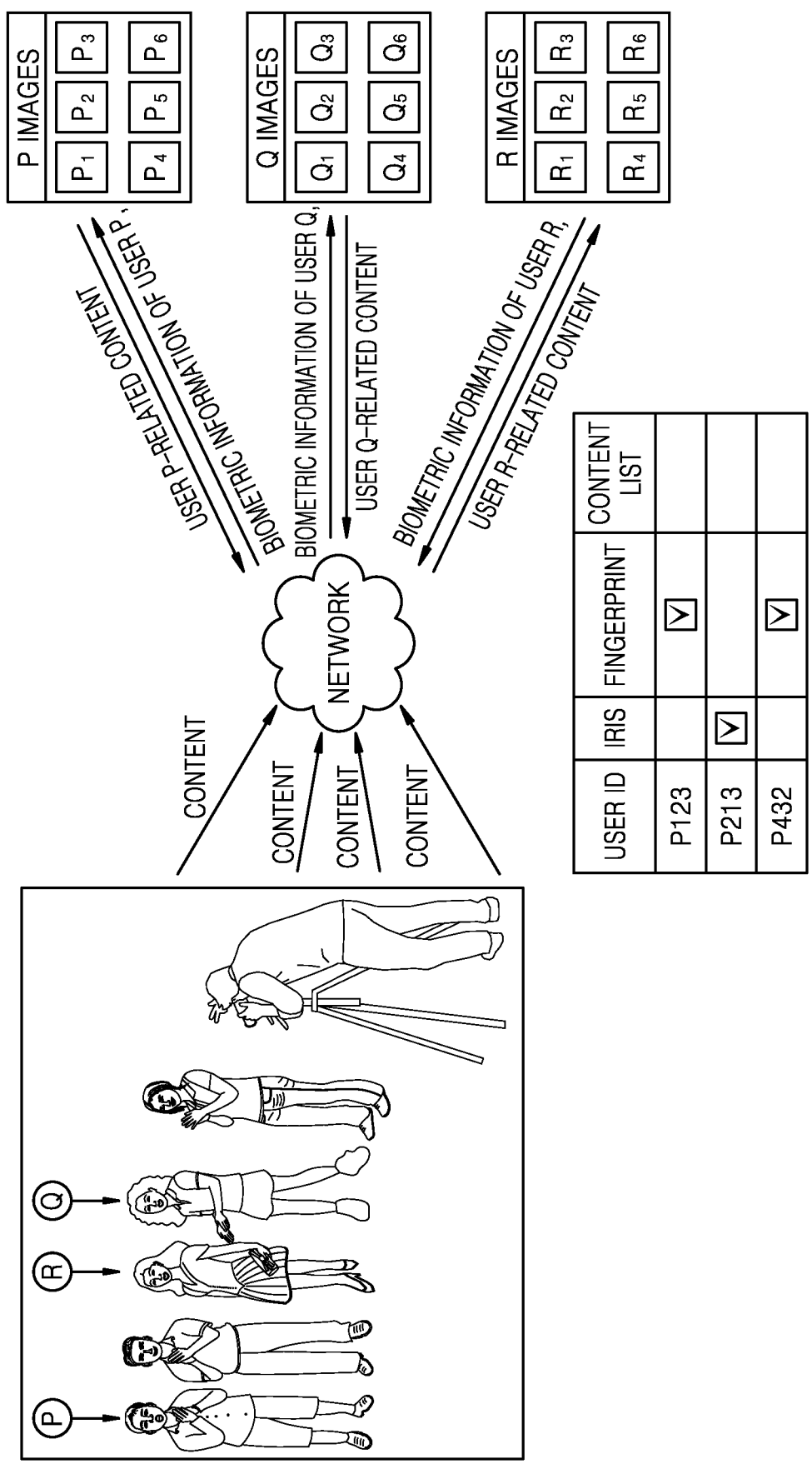
FIG. 11 is a view for explaining a method, performed by a device, of receiving content from a server according to an embodiment of the disclosure.

FIG. 11 is a view for explaining a method, performed by a device of receiving content generated by a plurality of devices according to an embodiment of the disclosure.

FIG. 11 illustrates a scenario where a photographer photographs a certain event or party in which a plurality of users P, Q, and R are participating. In this case, a pool of multimedia content includes multimedia content including the plurality of users P, Q, and R, and thus it may be difficult to identify multimedia content including each user.

According to an embodiment of the disclosure, all of the pieces of content captured in the party may be transmitted to a photographing device and may be stored in a server. A plurality of photographing devices may be included, and all of the pieces of multimedia content captured by the plurality of photographing devices may be transmitted to a sever. When user R desires to receive photos including himself or herself, user R may provide the device with fingerprint information of user R as an input for a content request. The device may transmit the fingerprint information of user R to a server including an association table. User ID of user R corresponding to the fingerprint information of user R may be identified from the associated table. Accordingly, the server may provide multimedia content into which the user ID of user R has been embedded. The provided multimedia content may include both content including only user R and content including not only user R but also the other users. According to the above-described method, the device may obtain content including user P or user Q.

Figure 12:
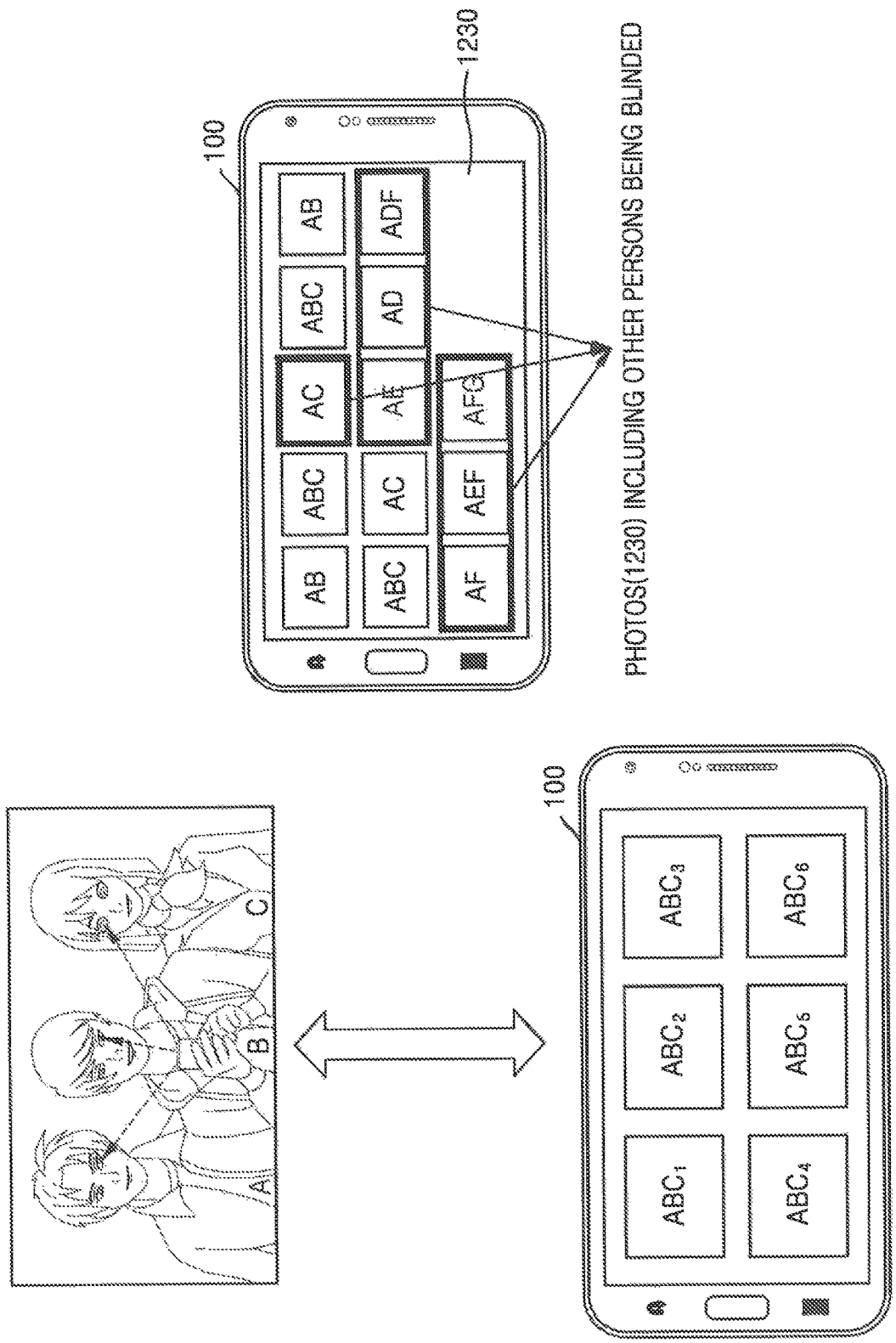
FIG. 12 is a view for explaining a method, performed by a device, of providing content including a plurality of users according to an embodiment of the disclosure.

FIG. 12 is a view for explaining a method, performed by a device of providing content including a plurality of users according to an embodiment of the disclosure.

According to an embodiment of the disclosure, when user A, user B, and user C use a single device 100, the device 100 may display only content (1220) including user A, user B, and user C. In detail, referring to FIG. 12, the device 100 may recognize respective pieces of iris information of user A, user B, and user C, and may display only content (1220) including ID corresponding to each of the recognized pieces of iris information. The device 100 may display content (1220) including at least one of user A, user B, or user C, but photos 1230 including users other than user A, user B, or user C may be blinded for their privacy.

According to an embodiment of the disclosure, when several people watch a gallery of the device 100 together, the device 100 may blind the photos 1230 including users other than the people who are watching the gallery together, whereby the privacy of users may be more protected than when all of the photos of the gallery are displayed.

FIG. 13 is a view for explaining a method, performed by a device of generating video content associated with user ID according to an embodiment of the disclosure.

Referring to FIG. 13, the device may receive at least one piece of biometric information corresponding to each of a plurality of users from the plurality of users while capturing a video. The device may store biometric information or user ID of a user, together with time information of a video clip including the user, in the header of captured video content.

In detail, when pieces of time information of video clips including a first user are T0 to T1, T3 to T4, and T5 to T6 in video content of the first user, the device may store, within mapping information, iris information and hand vein information of the first user together with the pieces of time information T0 to T1, T3 to T4, and T5 to T6 of the video clips including the first user.

According to an embodiment of the disclosure, the device may store biometric information or ID of people in the header of video content or an external metadata file. XML and JSON are major formats used to store external metadata. In a method of embedding biometric information or ID into video content, biometric information is embedded into the header of video content. Every JPEG file starts from binary value '0xFFD8' and ends by binary value '0xFFD9'. There are several binary 0xFFXX data in JPEG data, which are called as "Marker". Out of these markers range, one segment may be left for application of specific markers. These markers may be used by an application to specify information for each requirement. An example of a specific marker range application starts from 0xFFE0 to 0xFFEE.

According to an embodiment of the disclosure, the device may receive biometric information in order to search for a series of video clips corresponding to the first user. The device may search for first user ID corresponding to biometric information of the first user.

According to an embodiment of the disclosure, the device may extract data of video clips including the first user from among the video clips by using at least one piece of biometric information associated with the first user ID. In detail, referring to FIG. 13, the device may search for the video clips including the first user, based on pieces of biometric information. For example, referring to FIG. 13, making a video in which the first user appears may be considered. After the video making is terminated, the first user may want to watch all of the scenes where the first user appears. According to an embodiment of the disclosure, the device may extract video clips including the first user, based on biometric information of the first user obtained during video making. While the device is capturing video content, the device may also obtain biometric information and may store the obtained biometric information together with a time stamp in the header of the video content. As shown in FIG. 13, the iris information of the first user may be obtained. User ID of the first user or the iris information may be stored in the header of the video content, and a time stamp list for a corresponding scene may also be stored. Accordingly, when biometric information or ID of the first user is received, the device may obtain data of all of the video clips including the first user from the header of the video content.

Figure 14:
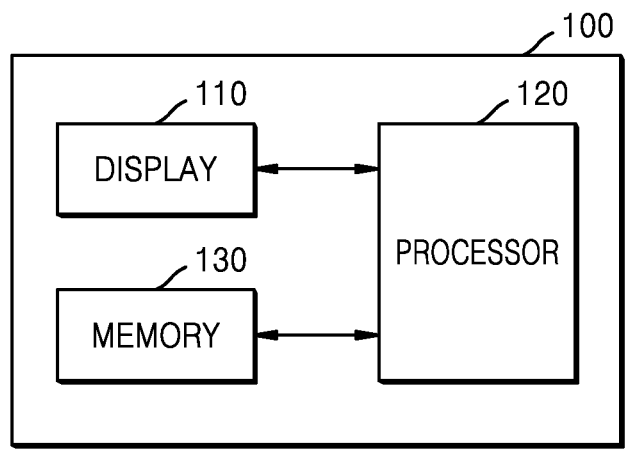
FIG. 14 is a block diagram of a device according to an embodiment of the disclosure.

FIG. 14 is a block diagram of a device according to an embodiment of the disclosure.

Referring to FIG. 14, the device 100 may include a display 110, a processor 120, and a memory 130. All of the components illustrated in FIG. 14 are not essential components of the device 100. More or less components than those illustrated in FIG. 14 may constitute the device 100. For example, the device 100 may further include a transceiver (not shown) for providing user-related content from an external server or device.

The processor 120 may control the device 100 to perform the aforementioned operations of FIGS. 1 through 13. In detail, in order to obtain first content including a first user, the processor 120 may obtain mapping information in which one or more pieces of biometric information for each of a plurality of users correspond to ID of each of the plurality of users.

The processor 120 may photograph the first user to obtain the first content including the first user. In this case, the processor 120 may obtain biometric information of the first user. In detail, the processor 120 may obtain the biometric information of the first user while photographing the first user. While the device 100 is photographing the first user, the processor 120 may obtain biometric information of the first user, such as iris information, retina information, or a facial thermogram of the first user. For example, the processor 120 may obtain biometric information of a user by controlling sensors (e.g., an IR sensor and a fingerprint recognition sensor).

The processor 120 may receive, through the transceiver, biometric information of a user from external devices (not shown) capable of obtaining biometric information.

The processor 120 may determine first user ID corresponding to the biometric information of the first user, based on mapping information. In detail, when the first user is included in the plurality of users, the processor 120 may determine the first user ID, based on the mapping information. On the other hand, when the first user is not included in the plurality of users, the processor 120 may generate user ID of the first user and determine the generated user ID as the first user ID.

The processor 120 may associate the first content with the first user ID and store the association in the memory 130, in order to access content by using user ID. The processor 120 may embed or insert the first user ID into metadata or a header of the first content.

The processor 120 may control one or more pieces of biometric information of the first user for a content request to be received. The processor 120 may search for multimedia content including the first user by using the received one or more pieces of biometric information of the first user. Accordingly, the processor 120 may access not only the content stored in the device 100 but also the content of an external device or the server 200. The processor 120 may control content related with the received one or more pieces of biometric information of the first user to be displayed on the display 110.

According to an embodiment of the disclosure, in order to access content including the first user, the processor 120 may determine the first user ID corresponding to the received one or more pieces of biometric information, based on the mapping information. In detail, the processor 120 may obtain user ID corresponding to the received one or more pieces of biometric information from the mapping information. When the first user ID corresponding to the received one or more pieces of biometric information is not found, the processor 120 may obtain biometric information of another first user.

According to an embodiment of the disclosure, the processor 120 may provide a content list including the first user, based on the determined first user ID. The processor 120 may render the provided content list. The processor 120 may control a content list or content to be displayed on the display 110.

The memory 130 may store a program used by the processor 120 to perform processing and control, and may also store data that is input to or output from the device 100. In detail, the memory 130 may store the mapping information and content associated with the mapping information. When biometric information or content of a user is received, the memory 130 may update pre-stored mapping information, based on the received biometric information or content.

The memory 130 according to an embodiment of the disclosure may store various pieces of data, various programs, or various applications for driving and controlling the device 100. A program stored in the memory 130 may include one or more instructions. A program (one or more instructions) or application stored in the memory 130 may be executed by the processor 120.

The memory 130 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The transceiver according to an embodiment of the disclosure may transmit or receive, to or from an external device or the server 200, a signal for providing the user-related content. In detail, the transceiver may transmit biometric information or mapping information to the external device or the server 200 in order to provide content including the user. The transceiver may receive the content including the user from the external device or the server 200. In other words, the transceiver may transmit or receive, to or from the server 200 and the external device, information necessary for providing the content including the user.

The transceiver may transmit or receive data to or from the external device according to various communication methods. For example, the transceiver may transmit information about the external device and receive a control signal through a network connected via a gateway. A communication method may be, but is not limited to, communication using a mobile communication network such as 3rd generation (3G), 4th generation (4G), 5th generation (5G), and Wi-Fi. Various other communication methods such as a Long Range (LoRa) technique, a Long Range Wide Area Network (LoRaWAN), Bluetooth, ZigBee, an Ad-hoc network, a Local Area Network (LAN), a Wide Area Network (WAN), and a wireless Internet.

The transceiver may exchange a wireless signal with at least one of a base station, an external terminal, or a server on a mobile communication network. Here, examples of the wireless signal may include a voice call signal, a video call signal, and various types of data according to text/multimedia messages transmission.

Figure 15:
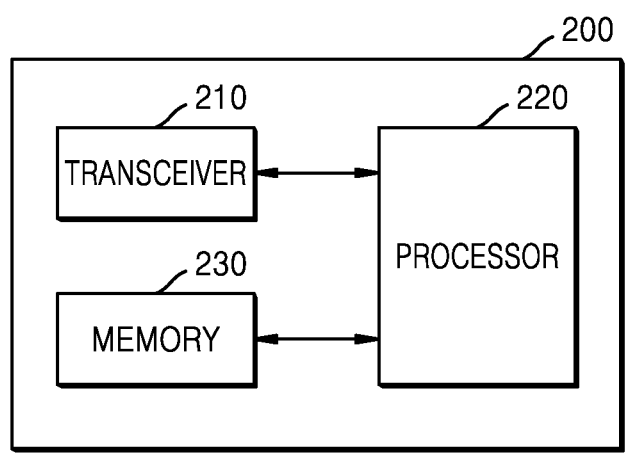
FIG. 15 is a block diagram of a server according to an embodiment of the disclosure.

FIG. 15 is a block diagram of a server according to an embodiment of the disclosure.

The server 200 may include a transceiver 210, a processor 220, and a memory 230. All of the components illustrated in FIG. 15 are not essential components of the server 200. More or less components than those illustrated in FIG. 15 may constitute the server 200.

The transceiver 210 according to an embodiment of the disclosure may transmit or receive, to or from the device 100, a signal for providing user-related content. In detail, the transceiver 210 may transmit or receive biometric information or mapping information to or from the device 100 in order to provide content including a user. The transceiver 210 may receive the content including the user from an external device. In other words, the transceiver 210 may transmit or receive, to or from the device 100 and the external device, information necessary for providing the content including the user.

The transceiver 210 may transmit or receive data to or from the external device according to various communication methods. Data may be transmitted or received to or from the external device according to the above-described various communication methods.

The processor 220 typically controls an overall operation of the server 200. For example, the processor 220 may control the transceiver 210 and the memory 230, and the like by executing the programs stored in the memory 230.

According to an embodiment of the disclosure, the processor 220 may control user biometric information or mapping information to be received from the device 100. At this time, the processor 220 may update the mapping information, based on the received user biometric information. In detail, the processor 220 may update the mapping information by associating content received from the device 100 or the external device with user ID. The processor 220 may store the user ID in the content received from the device 100 or the external device.

According to an embodiment of the disclosure, based on the received user biometric information, the processor 220 may control the device 100 to access the content including the user. The processor 220 may determine user ID corresponding to the biometric information of the user, based on the mapping information. The processor 220 may provide a content list including the user ID to the device 100.

Figure 16A:
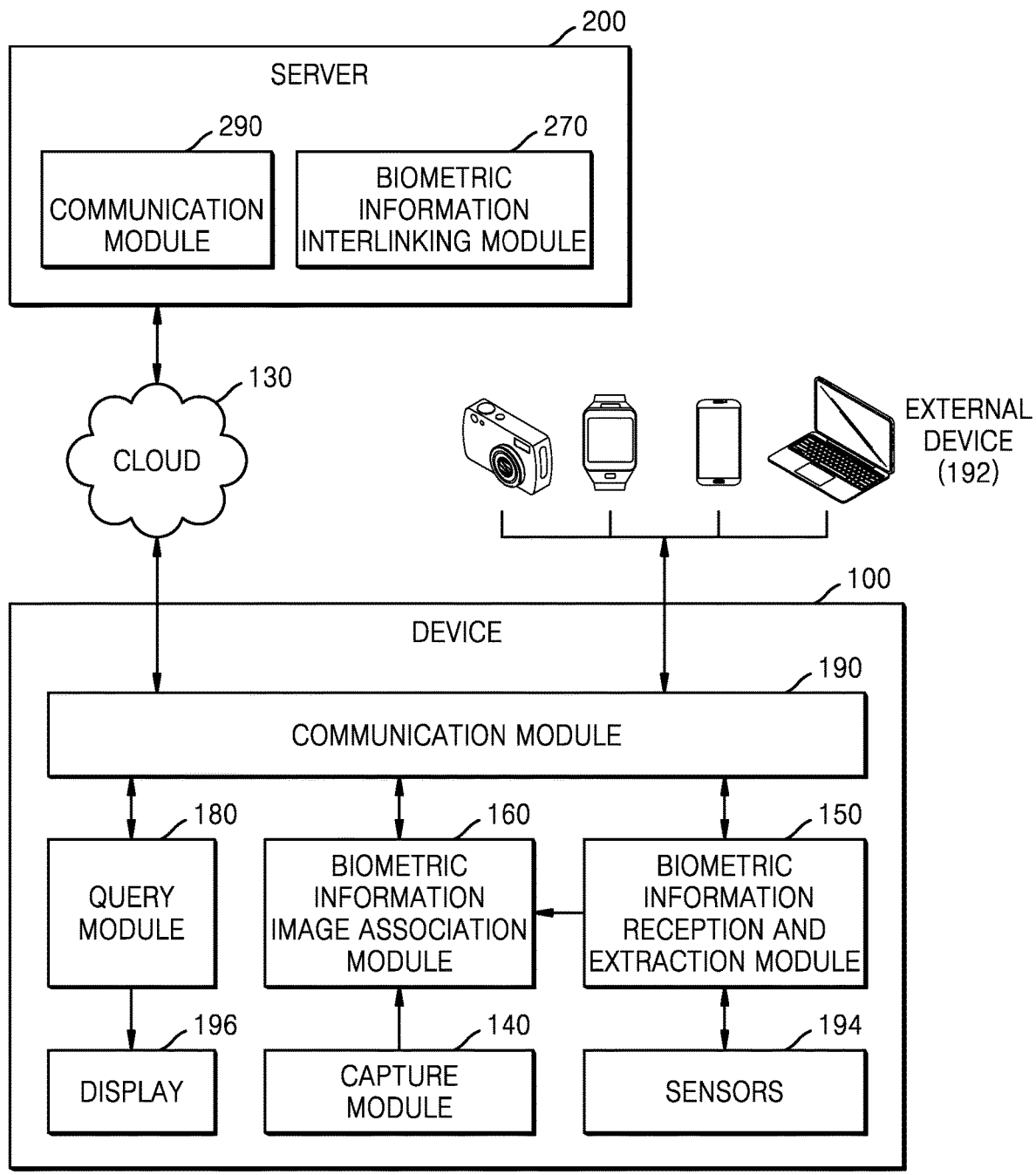
FIG. 16A shows a system architecture where a device is connected to a server over a network, according to an embodiment of the disclosure.
Figure 16B:
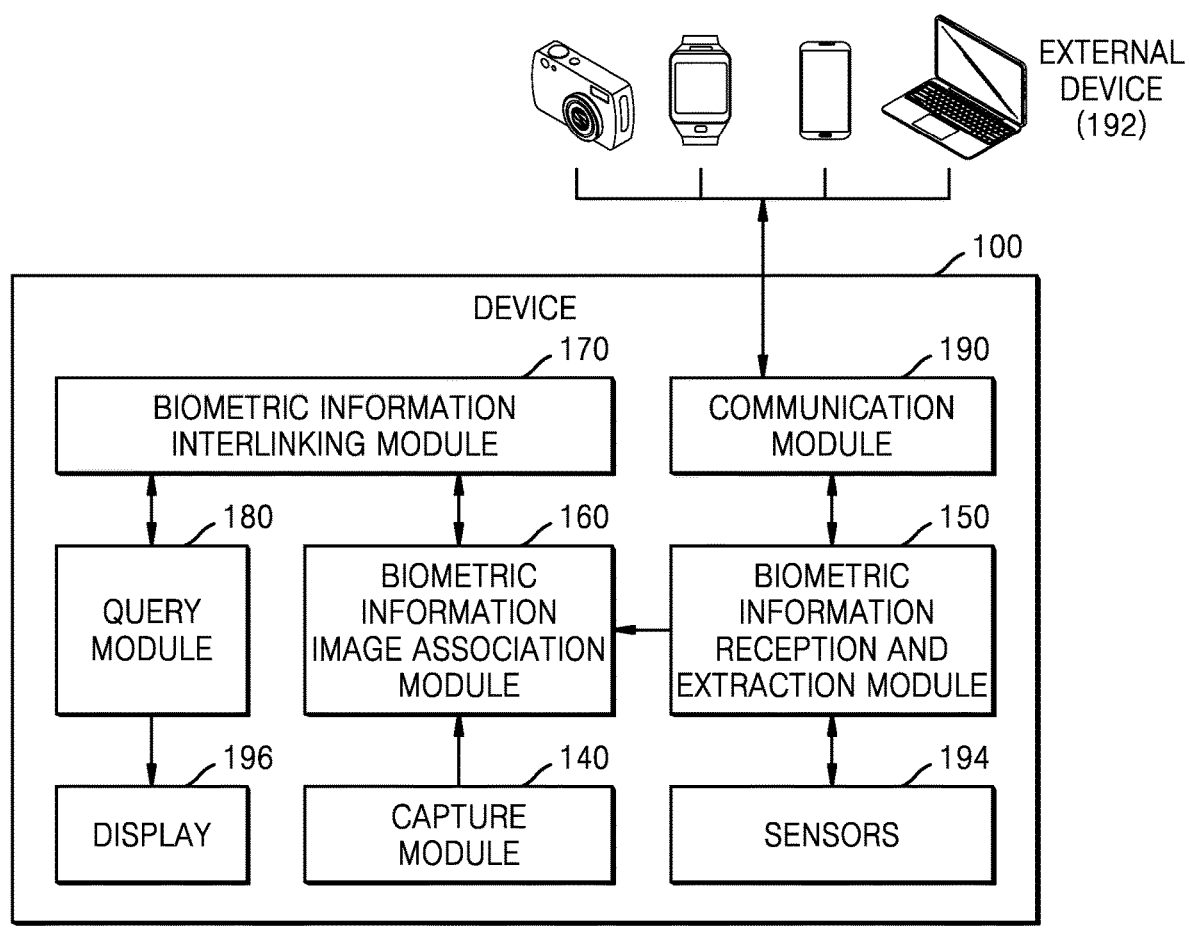
FIG. 16B shows system architecture of an independent device according to an embodiment of the disclosure.

FIG. 16A shows a system architecture where a device is connected to a server over a network, according to an embodiment of the disclosure, and FIG. 16B shows a system architecture of an independent device according to an embodiment of the disclosure.

The device 100 according to an embodiment of the disclosure may include a capture module 140, a biometric information reception and extraction module 150, a biometric information image association module 160, a query module 180, a plurality of sensors 194, a display 196, and a communication module 190. The communication module 190 may correspond to the transceiver, and the processor 120 may control the capture module 140, the biometric information reception and extraction module 150, the biometric information image association module 160, the query module 180, the plurality of sensors 194, the display 196, and the communication module 190.

The server 200 may include a communication module 290 and a biometric information interlinking module 270. The communication module 290 may correspond to the transceiver 210. The device 100 and the server 200 may be networked with a cloud 130 via the communication module 190.

The capture module 140 may capture multimedia content in the field of view of an external device 192 (e.g., a camera, a cellular phone, or a laptop computer, or a combination thereof). Persons who exist in the field of view of the external device 102 may be captured. The capture module 140 will activate the sensors 194 (e.g. biometric sensors) present on the device 100. While capturing a photo/video, biometric sensors may capture biometric data of the persons present in the field of view of sensors. For example, when a person captures a selfie, an IR/ultraviolet (UV) sensor may scan an iris or a retina, whereas a fingerprint sensor may capture fingerprint data of the person. Other features may also be extracted from the multimedia content by using existing methods such as image processing, image retrieval, and content based image retrieval. Some of the biometrics such as a face, an expression, or similarities may be extracted from the captured multimedia content.

The biometric information reception and extraction module 150 may fetch the biometric information by using the sensors 194 (an IR sensor, a fingerprint sensor, etc.) of the device 100 while capturing the multimedia content. An iris, a retina, and a fingerprint are some examples of biometric information that may be easily captured from the device 100. The biometric information reception and extraction module 150 may embed the biometric information in the metadata of captured multimedia content. In another method to receive a biometric information input from the device 100, a biometric information template (encrypted biometric information) already stored in the device 100 or any stored multimedia content having the embedded biometric information may be utilized. The biometric information may also be received from the external devices 192, like any other installed camera capable of capturing the retina or iris of a person who is being captured from the camera of the device 100. The biometric information may be received from the external device 192 (smart watch, mobile phone, etc.) of the person who is being captured. When biometric information of persons captured in the multimedia content, a face or other biometric may be used to fetch biometric information from an association table. The association table may be looked up for identifying required biometric information together with an additional input requested by a user, such as a mobile number. Other associated unique numbers such as a bank account number, a mobile number, and a password may be used as additional information together with pieces of biometric information. When the above-described methods fail to receive biometric information, a user may manually add such additional information to the multimedia content. When it is not possible to provide complex biometric data as an input in order to handle such a case, a user may provide any unique identifier associated with the persons captured in a photo. Such a unique identifier may be added in the association table. Thus, biometric information may also be received from the association table using other identifiers.

The biometric information image association module 160 may associate the multimedia content with biometric information of a photographed person. The biometric information image association module 160 may receive the multimedia content from the capture module 140, and biometric information of each involved person may be received from the biometric information reception and extraction module 150. According to an embodiment of the disclosure, the biometric information may be transmitted to the server 200 via the communication module 190. The biometric information interlinking module 270 of the server 200 may process, store, and interlink biometric information data in the association table of the server 200. For every person detected in the multimedia content, the biometric information interlinking module 270 may obtain IDs of the persons mapped with their biometric information from the association table. Received ID may be embedded to the header or metadata of the captured multimedia content. The embedded multimedia content may be stored in the device 100.

Referring to FIG. 16B, when a biometric information interlinking module 170 is executed in the device 100, pieces of biometric information for all persons may be encrypted and embedded directly into the header or metadata of the captured multimedia content according to the system architecture of FIG. 16B. The biometric information interlinking module 170 may process, store, and interlink the biometric information data within the association table of the device 100. Biometric information obtained from the biometric information reception and extraction module 150 or the biometric information interlinking module 170 may be embedded into the header or metadata of the captured multimedia content. The embedded multimedia content may be stored in the device 100.

The biometric information interlinking module 170 may receive biometric information and multimedia content ID from the biometric information image association module 160. The biometric information interlinking module 170 may store a plurality of pieces of biometric information in the association table and map the plurality of pieces of biometric information to single 128/256 bit ID. ID may be unique person ID (unique 128/256 bit key) generated by the biometric information interlinking module 170. A plurality of pieces of received biometric information of a person may be interlinked to each other through person ID stored in the association table. The plurality of pieces of received biometric information may be searched for from the association table. When biometric information is found, ID corresponding to the biometric information may be retrieved. All of the pieces of received biometric information may be mapped to corresponding ID and stored in the association table. When ID corresponding to biometric information is not found, new ID may be generated by the biometric information interlinking module 170. All of the pieces of received biometric information may be mapped to the new ID and stored in the association table. The pieces of biometric information of all persons detected in the multimedia content may be returned to the biometric information image association module 160.

The query module 180 may perform a multimedia content operation requested by the user. The query module 180 may retrieve multimedia content including any person(s), while sharing multimedia content on the Internet or identifying any person during surveillance. In detail, the query module 180 may find the selfies including any person, find all of the selfies captured by the device 100, and authenticate the multimedia content. All of these operations may be performed based on biometric information inputs directly scanned by a paired or connected device and received from the paired or connected device or by using biometric information extracted from the already captured multimedia content. The query module 180 may facilitate a mechanism of showing only the multimedia content associated with the requested operation of the user. The query module 180 may require biometric information and the type of an input operation and may return the ID of captured multimedia content associated with a user operation. The query module 180 may interact with the biometric information reception and extraction module 150 when a new query is generated. For example, the biometric information reception and extraction module 150 may provide encrypted biometric information to the query module 180. The query module 180 may transmit the encrypted biometric information to the cloud 130 or the server 200 where the association table is stored. A search may be performed in the association table such that biometric information is matched in the association table. When no match is found, the query module 180 may then interact again with the biometric information reception and extraction module 150 for other biometric information. When a match is found, the query module 180 may receive a list of multimedia content associated with a matched position in the association table. The device 100 may create a new multimedia content from a collected multimedia content list. The created new multimedia content list may be rendered in the device 100.

The communication module 190 may make the device 100 interact with external entities like the external device 192, the Internet, etc. The communication module 190 may include two sub-modules (not shown), for example, a sender module and a receiver module. When the device 100 wants to communicate with the external device 192, the device 100 may communicate with the help of the sender module. On the request of other trusted modules, the sender module may send the multimedia content or data along with the type of a request to external entities using Wi-Fi, Bluetooth, and the like. According to an embodiment of the disclosure, a user query along with pieces of biometric information may be sent to the server 200, and further processing may be performed to interlink the pieces of biometric information with each other. The receiver module may receive data for each query provided by the device 100 from the cloud 130 on a secure network. The query may be of receiving encrypted biometric information from the association table, or receiving multimedia content or a data list for matched biometric information from the association table. With the help of the received data, the device 100 may display the content on the device 100.

The objective of the disclosure may be to accurately identify or recognize a person by interlinking and embedding a plurality of pieces of biometric information of the persons present in the field view of a camera capturing the multimedia content. The plurality of pieces of biometric information of the persons detected in the captured multimedia content may be received by the external device 192 or the biometric information reception and extraction module 150. The biometric information reception and extraction module 150 may capture biometric information from the sensors of the device 100 or the external device 192. Biometric information may be received from other devices in the proximity of the device 100 or the external device 192. As necessary, biometric information of a person may be received from the server 200 or the cloud 130, both of which have been authenticated. Once received, the biometric information may be stored along with the metadata of the multimedia content or may be stored in the header of a multimedia content file.

According to an embodiment of the disclosure, a capturing module of the external device 192 may capture the multimedia content including the persons present in the field of view of the camera. There are multiple ways to capture the multimedia content including the persons; however, one of the multiple methods content may be a camera. The camera may be a digital or analog camera. There are various cameras available to capture various types of multimedia content. Some of the cameras may be or may include a still camera which is used to capture still photos of an object. A video camera may be used to capture moving videos of objects. An IR camera may capture heat-sensed images. The IR camera may be, for example, a thermographic camera (IR camera or thermal imaging camera) that forms an image using infrared radiation, similar to a common camera that forms an image by using visible light. A point cloud camera may capture the multimedia content in a 2D manner. The point cloud camera may be used to capture objects' images in a 3D manner (i.e. including depth information in an image). Moreover, there are many other ways to capture the multimedia content, such as taking a screen shot, scanning or copying of an already captured image, and cropping of the already captured image. Identification of a person may depend on the capabilities of an external device, a connected device, and the Internet to access an already created database and some manual inputs.

In another method to receive a biometric information input from the device 100, a unique biometric information template already stored in the device 100 or the multimedia content may be utilized. The device 100 may receive biometric information from the external device 192 that captures multimedia content. Examples of the biometric information may include a fingerprint. When it is impossible to receive biometric information of persons captured in the multimedia content, face recognition may be used to receive pieces of biometric information of a person from the server 200 or the device 100 and associate them. An association table stored in the device 100 or the server 200 may be looked up for receiving biometric information of a required user. To use associated unique IDs stored together with the biometric information in the association table, other unique numbers, such as bank account numbers, mobile phone numbers, and passwords, may also be used. These associated unique IDs (bank number, mobile number, etc.) may be used to identify the pieces of biometric information of a person in the association table.

The pieces of biometric information received from the biometric information reception and extraction module 150 may be interlinked with user ID by the biometric information interlinking module 170. Embedding pieces of biometric information or ID into metadata of the multimedia content file may be handled by the biometric information image association module 160 of the device 100. The captured multimedia content may contain huge data that may be used as information for different scenarios. Different features of objects and multimedia content that may be linked together with biometric information may be positions of objects in the multimedia content, and context of objects in the multimedia content that may be emotional states of objects, climate conditions, a background location, a geographical location, an external device ID, and a time stamp of a photo. Additional information from multimedia content along with biometric information may be useful for different filtering and identification use cases. Biometric information or ID of different persons present in the captured multimedia content may be stored in the header of the multimedia content or an external metadata file. XML and JSON are major formats used to store external metadata. A method of embedding pieces of biometric information and ID into multimedia content will be described below.

Biometric information of a user should not be stored without changes in the association table for the safety of ID. Hence, biometric information data needs to be encoded or encrypted. There are various methods for encrypting/encoding biometric information, and, as an example embodiment of the disclosure, some of the various methods are as follows. (1) Fixed Length Key Encryption: A same length key encryption method may involve transforming a biometric recognition template from a transformation function (F) to produce a fixed length key. The fixed length key may be used to encrypt the biometric information. Decryption may be performed through the same key that has been encrypted. A key may be generated again for decryption. A process of generating a key includes the operations when biometric information is transformed to a unique biometric template, and the biometric template is passed through the same transformation function (F) to produce a key for decryption. (2) Variable Length Key Encryption: A variable length key encryption method may involve using a unique biometric template itself as a key. Different pieces of biometric information may have different length templates. The same process may be performed for encryption as well as decryption, similar to the fixed length key encryption. (3) Single key encryption—decryption of multiple keys: This method may involve use of a single key for encryption of biometric information. This key may be generated by combining and transforming different/same pieces of biometric information of the objects included in multimedia content. Decryption in this method may be performed by any of the pieces of biometric information of the objects in the multimedia content. A method of generating a key during encryption involves fetching all the pieces of biometric information of the objects identified in the multimedia content and merging the pieces of biometric information with a special combination of flags like 0xFFFFFFFF to separate them from each other. The information included in the multimedia content may be encrypted using this key. During decryption, any one of the objects identified in the multimedia content provides biometric information, and then this biometric information is matched in the generated key between the values filled between the flags. When any of the values is matched, the multimedia content may be decrypted. In the encryption technique, every type of biometric information may be encrypted using the AES 128 encryption standard. The encrypted biometric information may be embedded into the multimedia content. For a plurality of pieces of biometric information for single 128/256 bit ID encryption, the encryption technique may encrypt a plurality of pieces of biometric information of a person of variable lengths to single encrypted ID. The ID may be stored in an ID column in the association table.

In an example embodiment of the disclosure, the device 100 may capture multimedia content of persons. The biometric information reception and extraction module 150 in the device 100 may extract the biometric information of the person detected in the multimedia content and insert the extracted biometric information into a person biometric information stack. The person biometric information stack may be a stack of biometric information lists of all persons detected in the multimedia content. The person biometric information stack may be sent to a cloud by the device 100 together with ID.

While multimedia content is being captured, any of received pieces of biometric information of a person may be associated with the multimedia content. For example, in some multimedia contents, one piece of biometric information may be associated, and other second biometric information may be associated. Hence, providing any biometric information to retrieve all respective multimedia contents may require interlinking of a plurality of pieces of biometric information to ID of each person. The interlinking of biometric information may be performed in the association table which may be maintained on a local device, a centralized server, or a cloud storage. The biometric information interlinking module 170 may control the interlinking of biometric information in the association table.

Once pieces of biometric information of a person are interlinked and biometric information or ID are embedded into the captured multimedia content, a user may perform various operations on the captured multimedia content, such as authenticating multimedia content, displaying multimedia content of a device user, and hiding non-relevant multimedia content. Control of these operations may be managed by the query module 180 of the device 100. Performing any of these operations may require receiving unique biometric identity of a person, identifying other unique biometric identities of the same person from the association table, and performing a required operation.

a) Receiving Biometric Information as an Input for Performing the Aforementioned Operations To perform any user's query on multimedia content database, an input may be provided to a system. The input may either be the biometric information provided by a user or the embedded multimedia content stored on the device 100. When the input is the biometric information provided by a user, pieces of biometric information may be captured directly from the device 100. An iris, a retina, and a fingerprint may be some examples of biometric information that may be easily captured from the device 100. When the input is biometric information, or ID embedded in multimedia content, pieces of biometric information or ID may be extracted from a header/metadata of the embedded multimedia content. When the biometric information is received as an input by the device 100, the device 100 may need authentication. At this time, the device 100 may be used by its owner as well as any other person. Hence, accessing the stored content is categorized in two parts. (1) when the user of the device 100 is the owner of the device 100, he or she may have the permission to access all of the pieces of stored content. The owner of the device 100 may be easily identified by scanning the iris, retina or fingerprint periodically. (2) When any person other than the owner of the device 100 accesses the stored content, he or she may only be able to access the multimedia content captured by the present user or the multimedia content in which a present user exists. To grant such a permission to the present user, the device 100 may fetch the biometric information of the present user. The device 100 may match the biometric information with biometric information which is registered for the owner of the device 100. When they do not match, it may be known that the present user is not the owner of the device 100. Thus, a restricted access may be given to the present user.

b) Identifying Pieces of Other Associated Biometric Information

While biometric information or ID of persons is embedded into the captured multimedia content, different pieces of biometric information of a single person may be embedded. For example, a first user may capture three selfies, and may associate each multimedia content with different pieces of biometric information of the first user. Accordingly, the first user may choose to embed first, second and third selfies with an iris, a retina, and a fingerprint, respectively, and all biometric information data may be interlinked to ID in the association table. When the device 100 performs operations related with the multimedia content, based on a provided input, it may be required to identify pieces of other interlinked biometric information. Because the data in the association table is secured, one of the pieces of biometric information may be searched for in the association table. When a match is found, a list of all pieces of biometric information of a person or ID needs to be identified in the association table. The identified list of pieces of biometric information or the identified ID need to be used to perform a required operation on the database of multimedia content.

c) Performing Operations on Multimedia Content, Based on Biometric Information

With the help of pieces of biometric information embedded with the multimedia content, operations may be broadly divided in following categories. However, the operations are not limited to multimedia content searching, selfie finding, multimedia content authentication, and dynamic filtering based on a present user and person identification in multiple cameras. Because a method according to the disclosure uses biometric information data of a person to perform a required operation, this method may provide a result with high accuracy. Moreover, because the method does not require any complex algorithm for multimedia content retrieval, a method of multimedia content filtering may be efficient.

Figure 17:
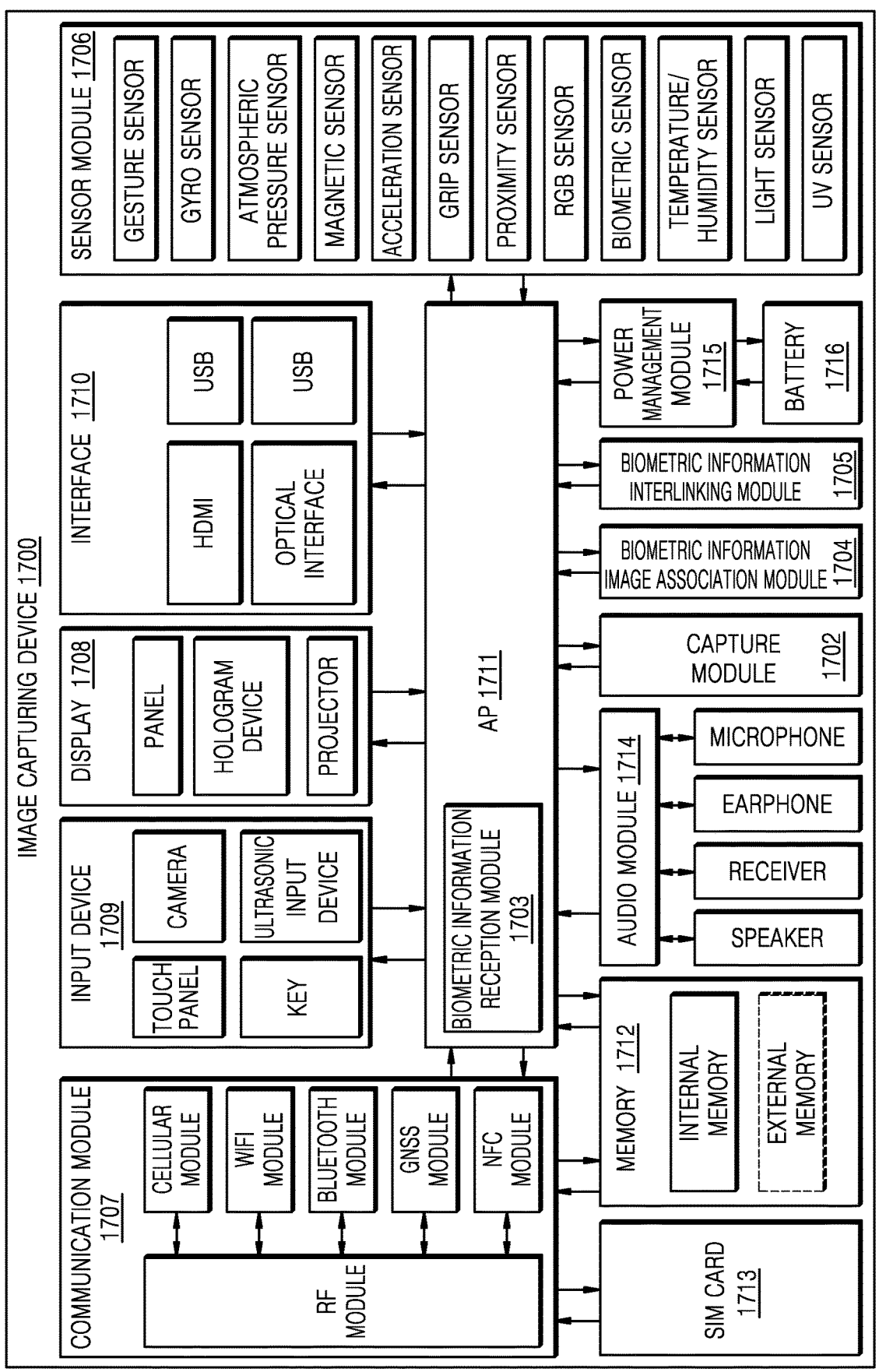
FIG. 17 is a block diagram of architecture of an image capturing device according to an embodiment of the disclosure.

FIG. 17 is a block diagram of an architecture of an image capturing device 1700 according to an embodiment of the disclosure.

Referring to FIG. 17, the image capturing device 1700 may include a capture module 1702, a biometric information reception module 1703, a biometric information image association module 1704, a biometric information interlinking module 1705, a sensor module 1706, a communication module 1707, a display 1708, an input device 1709, an interface 1710, an application processor (AP) 1711, a memory 1712, a subscriber identity module (SIM) card 1713, an audio module 1714, a power management module 1715, and a battery 1716.

The communication module 1707 may communicate with other devices and a server. The communication module 1707 may include a cellular module, a Wi-Fi module, a Bluetooth module, a Global Navigation Satellite System (GNSS) module, a Near Field Communications (NFC) module, and a radio frequency (RF) module. The input device 1709 may be used to control the image capturing device 1700. The input device 1709 may include a touch panel, a camera, a key, and an ultrasonic input device. The communication module 1707 may be further coupled with the SIM card 1713. The display 1708 may include a panel, a hologram device, and a projector. The interface 1710 may include a high-definition multimedia interface (HDMI) port, one or more universal serial bus (USB) ports, and an optical interface. The sensor module 1706 may be used to fetch the biometric identity of a person while capturing multimedia content. The sensor module 1706 may include a gesture sensor, a gyro sensor, an atmospheric pressure sensor, a magnetic sensor, an acceleration sensor, a GRIP sensor, a proximity sensor, a red, green, and blue (RGB) sensor, a biometric sensor, a temperature/humidity sensor, a light sensor, and a UV sensor. The memory 1712 is used to store captured multimedia content. The memory 1712 may include an internal memory and an external memory. The audio module 1714 may be coupled with a speaker, a receiver, an earphone, and a microphone.

According to an embodiment of the disclosure, the capture module 1702 may capture multimedia content of persons. The biometric information reception module 1703 may receive pieces of biometric information of a person captured in the field of view of the image capturing device 1700. The biometric information image association module 1704 may associate/embed pieces of biometric information in the captured multimedia content. The biometric information interlinking module 1705 may interlink a plurality of pieces of biometric information of a person with each other, and map the same in an association table which is stored in the image capturing device 1700.

In a method and device for generating content, according to an embodiment of the disclosure, ID of a user is stored in generated content, and thus a need of the user for obtaining desired content may be satisfied.

Moreover, in a method and device for generating content, according to an embodiment of the disclosure, a user included in content may be identified using user biometric information.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of a device, the operation method comprising:
   obtaining mapping information by making one or more pieces of biometric information for each of a plurality of users correspond to a user identification (ID) of each of the plurality of users;
   obtaining first content including a first user by photographing the first user;
   obtaining first biometric information of the first user;
   determining a first user ID corresponding to the first biometric information of the first user, based on the mapping information; associating the first content with the first user ID;
   storing the association of the first content with the first user ID;
   embedding the first user id and user associated data into metadata of the first content, the embedded user associated data comprising an encrypted portion of the first biometric information, the encrypted portion of the first biometric information separate from displayable data of the first content; and
   in case that biometric information of the plurality of users is received, providing a content list including the plurality of users and excluding users other than the plurality of users,
   wherein the encrypted portion of the first biometric information is configured to be decrypted to authenticate access to the first content,
   wherein the providing of the content list further comprises:
      recognizing respective pieces of biometric information of the plurality of users, the plurality of users currently reviewing photos on the device together; and
      based on the recognized respective pieces of biometric information of the plurality of users, displaying only content including IDs corresponding to each of the plurality of users currently reviewing the photos on the device together,
   wherein the first content further comprises video, and
   wherein the storing of the first content with the first user ID comprises inserting the first user ID into a header of the first content, the first user ID being inserted into a JPEG marker within a marker range of 0xFFE0 to OxFFEE.

2. The operation method of claim 1, wherein the first biometric information comprises at least one of fingerprint information, iris information, retina information, facial thermogram information, or deoxyribonucleic acid (DNA) information.

3. The operation method of claim 1, wherein the determining of the first user ID comprises:
   when the first user is included in the plurality of users, determining the first user ID, based on the mapping information; and
   when the first user is not included in the plurality of users, generating a user ID of the first user and determining the generated user ID as the first user ID.

4. The operation method of claim 1, wherein the obtaining of the first biometric information comprises obtaining the first biometric information while the first user is being photographed.

5. The operation method of claim 1, further comprising:
obtaining second biometric information of the first user; and
updating the mapping information by storing the first content and the obtained second biometric information in correspondence with the first user ID.

6. The operation method of claim 1, wherein the storing of the first content with the first user ID comprises inserting the first user ID into metadata of the first content or a header of the first content.

7. The operation method of claim 1, wherein the mapping information comprises an association table in which the one or more pieces of biometric information for each of the plurality of users are matched with the user ID of each of the plurality of users.

8. The operation method of claim 1, further comprising:
receiving one or more pieces of biometric information of the first user for a content request;
determining the first user ID corresponding to the received one or more pieces of biometric information of the first user, based on the mapping information; and
providing a content list including the first user, based on the determined first user ID.

9. The operation method of claim 8, wherein the content list comprises the first content associated with the first user ID.

10. The operation method of claim 8, wherein the providing of the content list comprises receiving content associated with the first user ID from an external device or a server and providing the received content.

11. A device comprising:
a display;
at least one memory storing one or more instructions; and
at least one processor configured, by executing the one or more instructions to control the device, to:
obtain mapping information by making one or more pieces of biometric information for each of a plurality of users correspond to a user identification (ID) of each of the plurality of users,
obtain first content including a first user by photographing the first user,
obtain first biometric information of the first user,
determine, based on the mapping information, a first user ID corresponding to the first biometric information of the first user,
associate the first content with the first user ID,
store the association of the first content with the first user ID,
embed the first user ID and user associated data into metadata of the first content, the embedded user associated data comprising an encrypted portion of the first biometric information, the encrypted portion of the first biometric information separate from displayable data of the first content, and
in case that biometric information of the plurality of users is received, provide a content list including the plurality of users and excluding users other than the plurality of users,
wherein the encrypted portion of the first biometric information is configured to be decrypted to authenticate access to the first content,
wherein the providing of the content list further comprises the processor being further configured to:
recognize respective pieces of biometric information of the plurality of users, the plurality of users currently reviewing photos on the device together; and
based on the recognized respective pieces of biometric information of the plurality of users, displaying only content including IDs corresponding to each of the plurality of users currently reviewing the photos on the device together,
wherein the first content further comprises video, and
wherein the storing of the first content with the first user ID comprises inserting the first user ID into a header of the first content, the first user ID being inserted into a JPEG marker within a marker range of 0xFFE0 to 0xFFEE.

12. The device of claim 11, wherein the first biometric information comprises at least one of fingerprint information, iris information, retina information, facial thermogram information, or deoxyribonucleic acid (DNA) information.

13. The device of claim 11,
wherein, when the first user is included in the plurality of users, the at least one processor is further configured, by executing the one or more instructions, to determine the first user ID, based on the mapping information, and
wherein, when the first user is not included in the plurality of users, the at least one processor is further configured, by executing the one or more instructions, to:
generate a user ID of the first user, and
determine the generated user ID as the first user ID.

14. The device of claim 11, wherein the at least one processor is further configured, by executing the one or more instructions, to obtain the first biometric information while the first user is being photographed.

15. The device of claim 11, wherein the at least one processor is further configured, by executing the one or more instructions, to:
obtain second biometric information of the first user; and
update the mapping information by storing the first content and the obtained second biometric information in correspondence with the first user ID in the at least one memory.

16. The device of claim 11, wherein the at least one processor is further configured, by executing the one or more instructions, to insert the first user ID into metadata of the first content or a header of the first content.

17. The device of claim 11, wherein the mapping information comprises an association table in which the one or more pieces of biometric information for each of the plurality of users are matched with the user ID of each of the plurality of users.

18. The device of claim 11, wherein the at least one processor is further configured, by executing the one or more instructions, to:
receive one or more pieces of biometric information of the first user for a content request;
determine the first user ID corresponding to the one or more pieces of biometric information of the first user, based on the mapping information; and
display a content list including the first user on the display, based on the determined first user ID.

19. The device of claim 18, wherein the content list comprises the first content associated with the first user ID.

20. The device of claim 11, further comprising:
a transceiver,
wherein the at least one processor is further configured, by executing the one or more instructions, to:
receive content associated with the first user ID from an external device or a server via the transceiver, and
display the received content on the display.

* * * * *